US009430913B2

(12) United States Patent
Saunders et al.

(10) Patent No.: US 9,430,913 B2
(45) Date of Patent: Aug. 30, 2016

(54) GAMING SYSTEM AND METHOD PROVIDING A SLOT GAME AND ENABLING ACCUMULATION OF GRAPHICAL IMAGE SYMBOLS

(71) Applicant: IGT, Las Vegas, NV (US)

(72) Inventors: Brian F. Saunders, Sunnyvale, CA (US); Scott A. Caputo, Santa Clara, CA (US); Michael D. Shorrock, San Anselmo, CA (US); Timothy L. Isaacson, Alameda, CA (US)

(73) Assignee: IGT, Las Vegas, NV (US)

( * ) Notice: Subject to any disclaimer, the term of this patent is extended or adjusted under 35 U.S.C. 154(b) by 401 days.

(21) Appl. No.: 14/028,901

(22) Filed: Sep. 17, 2013

(65) Prior Publication Data

US 2015/0080096 A1 Mar. 19, 2015

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.

CPC .......... *G07F 17/34* (2013.01); *G07F 17/3244* (2013.01); *G07F 17/3267* (2013.01)

(58) Field of Classification Search

CPC .......................... G07F 17/326; G07F 17/3258

USPC ............................................. 463/16, 20, 25

See application file for complete search history.

(56) References Cited

U.S. PATENT DOCUMENTS

| | | | |
|---|---|---|---|
| 5,743,526 | A | 4/1998 | Inoue |
| 5,769,716 | A | 6/1998 | Saffari et al. |
| 5,788,573 | A | 8/1998 | Baerlocher et al. |
| 5,833,537 | A | 11/1998 | Barrie |
| 5,947,820 | A | 9/1999 | Morro et al. |
| 6,095,921 | A | 8/2000 | Walker et al. |
| 6,162,121 | A | 12/2000 | Morro et al. |
| 6,334,814 | B1 | 1/2002 | Adams |
| 6,346,043 | B1 | 2/2002 | Colin et al. |
| 6,364,765 | B1 | 4/2002 | Walker et al. |
| 6,461,241 | B1 | 10/2002 | Webb et al. |

(Continued)

FOREIGN PATENT DOCUMENTS

| | | |
|---|---|---|
| GB | 2 157 047 | 10/1985 |

OTHER PUBLICATIONS

Incredible Technologies, Inc. :: Games :: All Mixed Up, available at http://gaming.itsgames.com/games/all-mixed-up, Apr. 25, 2014 (2 pages).

(Continued)

*Primary Examiner* — James C McClellan

(74) *Attorney, Agent, or Firm* — Neal, Gerber & Eisenberg LLP

(57) ABSTRACT

Various embodiments of the present disclosure provide a gaming system and method providing a slot game and enabling accumulation of graphical image symbols. Generally, in various embodiments, the gaming system enables a player to accumulate graphical image symbols during play of the slot game and, when a complete set of the graphical image symbols is accumulated such that a graphical image associated with that complete set is displayed, provides a feature to the player. The gaming system of the present disclosure thus encourages players to continue play of the slot game to attempt to accumulate a complete set of the graphical image symbols such that the gaming system provides the feature.

23 Claims, 18 Drawing Sheets

(56) References Cited

U.S. PATENT DOCUMENTS 6,464,582 B1 10/2002 Baerlocher et al.
6,554,703 B1 4/2003 Bussick et al.
6,599,193 B2 7/2003 Baerlocher et al.
6,632,139 B1 10/2003 Baerlocher
6,652,378 B2 11/2003 Cannon et al.
6,669,559 B1 12/2003 Baerlocher et al.
6,682,419 B2 1/2004 Webb et al.
6,682,420 B2 1/2004 Webb et al.
6,688,975 B2 2/2004 Baerlocher et al.
6,692,353 B2 2/2004 Walker et al.
6,726,563 B1 4/2004 Baerlocher et al.
6,733,389 B2 5/2004 Webb et al.
6,746,328 B2 6/2004 Cannon et al.
6,749,502 B2 6/2004 Baerlocher
6,758,747 B2 7/2004 Baerlocher
6,758,757 B2 7/2004 Luciano, Jr. et al.
6,780,107 B2 8/2004 Baerlocher et al.
6,780,111 B2 8/2004 Cannon et al.
6,805,629 B1 * 10/2004 Weiss ...................... G07F 17/32
273/138.1
6,840,858 B2 1/2005 Adams
6,843,724 B2 1/2005 Walker et al.
6,878,061 B2 4/2005 Baerlocher et al.
6,885,053 B1 4/2005 Tsujioka
6,929,952 B2 8/2005 Baerlocher
6,939,229 B2 9/2005 McClintic
6,964,416 B2 11/2005 McClintic et al.
6,981,917 B2 1/2006 Webb et al.
7,040,983 B2 5/2006 Dolloff et al.
7,056,192 B2 6/2006 Venigalla et al.
7,056,214 B2 6/2006 Miereau et al.
7,128,646 B2 10/2006 Baerlocher et al.
7,169,046 B2 1/2007 Webb et al.
7,223,172 B2 5/2007 Baerlocher et al.
7,229,350 B2 6/2007 Baerlocher et al.
7,252,591 B2 8/2007 Van Asdale
7,314,409 B2 1/2008 Maya et al.
7,351,140 B2 4/2008 Wolf et al.
7,399,226 B2 7/2008 Mishra
7,413,510 B2 8/2008 Schlegel et al.
7,448,948 B2 11/2008 Hughs-Baird et al.
7,674,180 B2 3/2010 Graham et al.
7,789,755 B2 9/2010 Davis et al.
7,794,320 B2 9/2010 Baerlocher et al.
7,862,430 B2 1/2011 Baerlocher et al.
7,874,908 B2 1/2011 Walker et al.
7,985,133 B2 7/2011 Baerlocher et al.
8,002,620 B2 8/2011 Nicely et al.
8,092,302 B2 1/2012 Cuddy et al.
8,142,280 B2 3/2012 Walker et al.
8,152,630 B2 4/2012 Cohen
8,272,946 B2 9/2012 Cuddy et al.
8,277,302 B2 10/2012 Walker et al.
8,376,836 B2 2/2013 Baerlocher et al.
8,382,572 B2 2/2013 Hoffman et al.
8,425,303 B2 4/2013 Kennedy et al.
8,449,362 B2 5/2013 Jackson
2003/0069057 A1 4/2003 DeFrees-Parrott
2003/0125102 A1 7/2003 Cannon
2003/0186733 A1 10/2003 Wolf et al.
2003/0190945 A1 10/2003 Bussick et al.
2003/0207709 A1 11/2003 Paotrakul
2004/0106446 A1 6/2004 Cannon et al.
2004/0110555 A1 6/2004 Devaull et al.
2004/0171416 A1 9/2004 Baerlocher et al.
2004/0209663 A1 10/2004 Webb et al.
2005/0037832 A1 2/2005 Cannon
2005/0043082 A1 2/2005 Peterson et al.
2005/0049042 A1 3/2005 Walker et al.
2005/0059468 A1 3/2005 Cannon
2005/0059470 A1 3/2005 Cannon
2005/0059471 A1 3/2005 Cannon
2005/0064932 A1 3/2005 Cannon
2005/0070353 A1 3/2005 Webb et al.
2005/0096114 A1 5/2005 Cannon et al.
2005/0153773 A1 7/2005 Nguyen et al.
2005/0181860 A1 8/2005 Nguyen et al.
2005/0192086 A1 9/2005 Walker et al.
2006/0068874 A1 3/2006 Hornik et al.
2006/0068893 A1 3/2006 Jaffe et al.
2006/0073879 A1 4/2006 Baerlocher
2006/0073897 A1 4/2006 Englman et al.
2006/0079309 A1 4/2006 Walker et al.
2006/0094495 A1 5/2006 Gelber et al.
2006/0111170 A1 5/2006 Hornik et al.
2006/0121971 A1 6/2006 Slomiany et al.
2006/0121972 A1 6/2006 Walker et al.
2006/0160625 A1 7/2006 Englman et al.
2006/0189379 A1 8/2006 Pacey
2006/0205465 A1 9/2006 Dolloff et al.
2006/0264257 A1 11/2006 Jaffe et al.
2006/0287035 A1 12/2006 Walker et al.
2007/0060287 A1 3/2007 Reddicks et al.
2007/0060297 A1 3/2007 Hein
2007/0077979 A1 4/2007 Cohn et al.
2007/0117610 A1 5/2007 Webb et al.
2007/0123341 A1 5/2007 Tessmer et al.
2007/0202943 A1 8/2007 Thomas
2007/0213119 A1 9/2007 Baerlocher et al.
2007/0259706 A1 11/2007 Anderson et al.
2007/0259714 A1 11/2007 Block et al.
2007/0298856 A1 12/2007 Gilmore et al.
2008/0076542 A1 3/2008 Iddings et al.
2010/0029367 A1 2/2010 Englman et al.
2010/0081497 A1 4/2010 Wolf et al.
2010/0113122 A1 5/2010 Walker et al.
2010/0137056 A1 6/2010 Hoffman et al.
2011/0003627 A1 1/2011 Nicely et al.
2012/0214580 A1 8/2012 Hoffman et al.
2013/0065669 A1 3/2013 Michaelson et al.
2013/0079098 A1 3/2013 Nicely et al.
2013/0079123 A1 3/2013 Nicely et al.
2013/0084961 A1 4/2013 Radisich et al.
2013/0084962 A1 4/2013 Radisich et al.
2013/0084994 A1 4/2013 Farrar
2013/0190066 A1 7/2013 Saunders
2014/0087855 A1 3/2014 Caputo et al.

OTHER PUBLICATIONS

Slot Review: Yukon Gold from WMS Gaming, available at http://robison.casinocitytimes.com/article/slot-review-yukon-gold-from-wms-gaming-447, Aug. 30, 2002 (3 pages).

* cited by examiner

GAMING SYSTEM AND METHOD PROVIDING A SLOT GAME AND ENABLING ACCUMULATION OF GRAPHICAL IMAGE SYMBOLS

COPYRIGHT

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems, are amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for single play of the primary game. For instance, a gaming system configured to operate a slot game may have one or more paylines and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such at video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination ire the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, sneakers, display screens, etc. Part of the enjoyment and excitement of playing certain gaming systems is the ton or triggering of a bonus game, even before the player knows an amount of a bonus award won via the bonus game.

Various players continually seek out new and different variations to gaming systems. A continuing need thus exists for gaming systems and methods that provide new, exciting, and engaging games.

SUMMARY

Various embodiments of the present disclosure provide a gaming system and method providing a slot game and enabling accumulation of graphical image symbols. Generally, in various embodiments, the gaming system enables a player to accumulate graphical image symbols during play of the slot game and, when a complete set of the graphical image symbols is accumulated such that a graphical image associated with that complete set is displayed, provides a feature to the player. The gaming system of the present disclosure thus encourages players to continue play of the slot game to attempt to accumulate a complete set of the graphical image symbols such that the gaming system provides the feature.

More specifically, in operation of one embodiment, the gaming system displays a first set of a plurality of first symbol display areas and separately displays a second different set of a plurality of second symbol display areas. For a play of the slot game, for each of the first symbol display areas of the first set, the gaming system displays one of a plurality of different symbols at that symbol display area. In this embodiment (a) the plurality of different symbols includes a plurality of different graphical image symbols and a plurality of different game symbols, (b) each of the graphical image symbols is associated with a portion of a graphical image, and (c) each of the graphical image symbols is associated with one of the second symbol display areas of the second set. The gaming system displays any awards associated with any game symbols displayed at the first symbol display are of the first set.

If a graphical image symbol is displayed at one of the first symbol display areas of the first set and if a graphical image symbol is not already displayed at the second symbol display area of the second set with which that displayed graphical image symbol is associated, the gaming system accumulates that displayed graphical image symbol. The gaming system displays that accumulated graphical image symbol at the second symbol display area of the second set with which that accumulated graphical image symbol is associated. If a complete set of the graphical image symbols is accumulated such that the graphical image symbols displayed at the second symbol display areas of the second sot form the graphical image, the gaming system provides a feature to the player.

In operation of another embodiment, the gaming system displays a first set of a plurality of first symbol display areas and separately displays a second different sat of a plurality of second symbol display areas. For a play of the slot game, for each of the first symbol display areas of the first set the gaming system displays one of a plurality of different symbols at that symbol display area. In this embodiment (a) the plurality of different symbols includes a plurality of different graphical image symbols and a plurality of different game symbols, (b) each of the graphical image symbols is associated with a portion of at least one of a plurality of different graphical images, and (c) each of the graphical image symbols is associated with one of the second symbol display areas of the second set. The gaming system displays any awards associated with any game symbols displayed at the first symbol display areas of the first set.

If a graphical image symbol is displayed at one of the first symbol display areas of the first set and if a graphical image symbol is not already displayed at the second symbol display area of the second set with which that displayed graphical image symbol is associated, the gaming system accumulates that displayed graphical image symbol. The gaming system displays that accumulated graphical image symbol at the second symbol display area of the second set with which that accumulated graphical image symbol is associated.

If a first complete set of a plurality of the graphical image symbols is accumulated such that a first one of the graphical images is displayed, the gaming system provides a first one of a plurality of different features. If a second different complete set of a plurality of the graphical image symbols is accumulated such that a second different one of the graphical images is displayed, the gaming system provides a second different one of the features. In this embodiment: (a) the first complete set of the graphical image symbols includes at least one graphical image symbol not included in the second complete set of the graphical image symbols, (b) the second complete set of the graphical image symbols includes at least one graphical image symbol not included in the first complete set of the graphical image symbols, and (c) the first complete set of the graphical image symbols and the second complete set of the graphical image symbols each include at least one same one of the graphical image symbols.

It should thus be appreciated that the gaming system and method of the present disclosure provide a new game to increase player engagement, enjoyment, entertainment, and excitement.

Additional features and advantages are described herein, and will be apparent from, the following Detailed Description and the Figures.

DETAILED DESCRIPTION

Accumulation of Graphical Image Symbols

Various embodiments of the present disclosure provide a gaming system and method providing a slot game and enabling accumulation of graphical image symbols. Generally, in various embodiments, the gaming system enables a player to accumulate graphical image symbols during play of the slot game and, when a complete set of the graphical image symbols is accumulated such that a graphical image associated with that complete set is displayed, provides a feature to the player. The gaming system of the present disclosure thus entourages players to continue play of the slot game to attempt to accumulate a complete set of the graphical image symbols such that the gaming system provides the feature.

While the slot game is implemented as a primary wagering game in the embodiments described herein, it should be appreciated that the slot game of the present disclosure may additionally or alternatively be implemented as a bonus or secondary game. Further, while any credit balances, any wagers, and any awards are displayed as amounts of monetary currency or credits in this example embodiment, one or more of such credit balances, such wagers, and such awards may be for any suitable non-monetary credits or currency, promotional credits, and/or player tracking points or credits.

Figure 1:
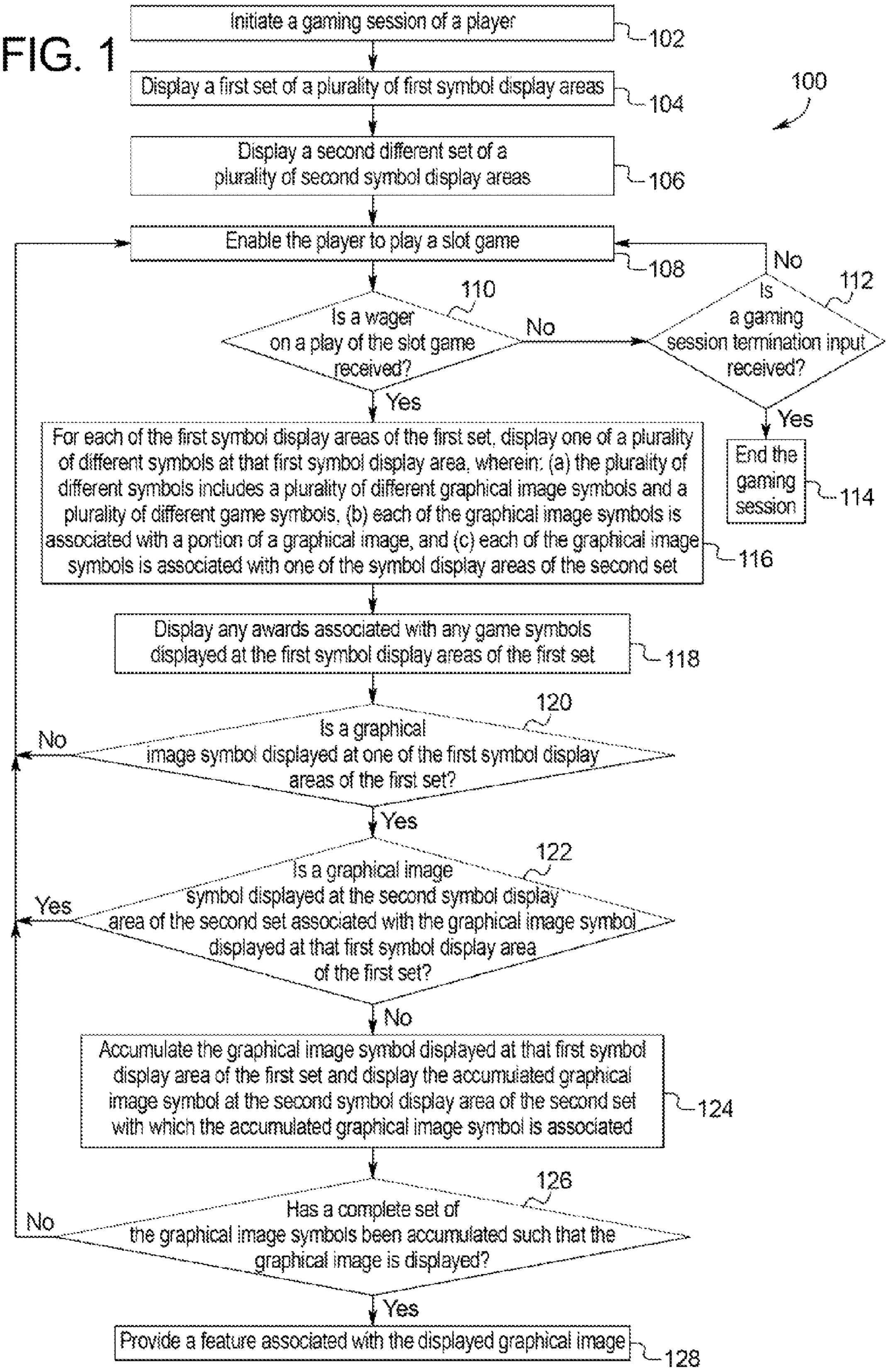
FIG. 1 is a flowchart illustrating an example method of operating one embodiment of the gaming system of the present disclosure.

FIG. 1 illustrates a flowchart of an example process of method 100 of operating one embodiment of the gaming system of the present disclosure. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the gaming system initiates a gaming session of a player, as indicated by block 102. The gaming system displays a first set of a plurality of symbol display areas, as indicated by block 104, and a second different set of a plurality of symbol display areas, as indicated by block 106. The gaming system enables the player to play a slot game, as indicated by block 108. The gaming system determines whether a wager on a play of the slot game was received, as indicated by diamond 110.

If the gaming system determines that a wager on a play of the slot game was not received, the gaming system determines whether a gaming session termination input was received (such as when the gaming system receives a cash out input or when the gaming system determines that a player tracking card has been removed from the gaming system), as indicated by diamond 112. If the gaming system determines that the gaming session termination input was received, the gaming system ends the gaming session, as indicated by block 114. If, on the other hand, the gaming system determines that the gaming session termination input was not received, the process 100 returns to block 108.

Returning to diamond 110, if the gaming system determines that a wager on a play of the slot game was received, for each of the first symbol display areas of the first set, the gaming system displays one of a plurality of different symbols at that symbol display area, as indicated by block 116. In this example embodiment, (a) the plurality of different symbols includes a plurality of different graphical image symbols and a plurality of different game symbols, (b) each of the graphical image symbols is associated with or represents a portion of a graphical image, and (c) each of the graphical image symbols is associated with one of the second symbol display areas of the second set. The gaming system displays any awards associated with any game symbols displayed at the first symbol display areas of the first set, as indicated by block 118.

The gaming system determines if a graphical image symbol is displayed at one of the first symbol display areas of the first set, as indicated by diamond 120. If the gaming system determines that a graphical image symbol is not displayed at any of the first symbol display areas of the first set the process 100 returns to block 108. If, on the other hand, the gaming system determines that a graphical image symbol is displayed at one of the first symbol display areas of the first set, the gaming system determines whether a graphical image symbol is displayed at the second symbol display area of the second set associated with the graphical image symbol displayed at that first symbol display area of the first set, as indicated by diamond 122. If the gaming system determines that a graphical image symbol is displayed at the second symbol display area of the second set associated with the graphical image symbol displayed at that first symbol display area of the first set, the process 100 returns to block 108.

If, on the other hand, the gaming system determines that a graphical image symbol is not displayed at the second symbol display area of the second set associated with the graphical image symbol displayed at that first symbol display area of the first set, the gaming system: (a) accumulates the graphical image symbol displayed at that first symbol display area of the first set, and (b) displays the accumulated graphical image symbol at the second symbol display area of the second set with which the accumulated graphical image symbol is associated, as indicated by block 124.

The gaming system determines whether a complete set of the graphical image symbols has been accumulated such that the graphical image is displayed, as indicated by diamond 126, if the gaming system determines that the complete set of the graphical image symbols has not been accumulated, the process 100 returns to block 108. If, on the other hand, the gaming system determines that the complete set of the graphical image symbols has been accumulated such that the graphical image is displayed, the gaming system provides a feature associated with the displayed graphical image, as indicated by block 128.

In various embodiments, such as the example embodiment described above with respect to FIG. 1, if: (a) a graphical image symbol is displayed at one of the first symbol display areas of the first set, and (b) a graphical image symbol is not displayed at the second symbol display area of the second set associated with the graphical image symbol displayed at that first symbol display area of the first set, the gaming system accumulates the graphical image symbol displayed at that first symbol display area of the first set. Thus, in these embodiments, the gaming system may accumulate a particular graphical image symbol displayed at one of the first symbol display areas of the first set regardless of the particular first symbol display area of the first set at which the accumulated graphical image symbol is displayed.

In other embodiments, each of the first symbol display areas of the first set corresponds to or is otherwise associated with one of the second symbol display areas of the second set. In these embodiments, if: (a) a graphical image symbol is displayed at one of the first symbol display area of the first set, (b) the graphical image symbol displayed at that first symbol display area of the first set and that first symbol display area of the first set are both associated with the same second symbol display area of the second set, and (c) a graphical image symbol is not displayed at the second symbol display area of the second set with which the graphical image symbol displayed at that first symbol display area of the first set and that first symbol display area of the first set are associated, the gaming system accumulates the graphical image symbol displayed at that first symbol display area of the first set. Thus, in these embodiments, the gaming system may accumulate a particular graphical image symbol if that graphical image symbol is displayed at a particular one of the first symbol display areas of the first set, and does not accumulate that graphical image symbol if that graphical image symbol is displayed at another one of the first symbol display areas of the first set.

It should be appreciated that the feature that the gaming system provides when a complete set of graphical image symbols is accumulated such that a graphical image associated with that complete set of graphical image symbols is displayed may be any suitable feature such as, but not limited to: (1) monetary credits or currency (2) non-monetary credits or currency; (3) a modifier (such as a multiplier) used to modify one or more awards; (4) one or more free plays of a game (such as one or more free spins of a slot game); (5) one or more plays of one or more bonus games (such as a free spin of an award wheel); (6) one or more lottery based awards (such as one or more lottery or drawing tickets); (7) a wager match for one or more plays of the a wagering game; (8) an increase in an average expected payback percentage of a bonus game and/or an average expected payback percentage of a primary wagering game for one or more plays; (9) one or more comps (such as a free dinner or a free night's stay at a hotel); (10) one or more bonus or promotional credits usable for online play; (11) one or more player tracking points; (12) a multiplier for player tracking points or credits; (13) an increase in a membership or player tracking level; (14) one or more coupons or promotions usable within a gaming establishment and/or outside of the gaming establishment (e.g., a 20% off coupon for use at a retail store or a promotional code providing a deposit match for use in association with an online casino); (15) an access code usable to unlock content on the Internet (16) a progressive jackpot or other progressive award; (17) a high value product or service such as a car); and/or (18) a low value product or service (such as a teddy bear).

In one embodiment, such as the example embodiment described below with respect to FIGS. 2A to 2F, the gaming system unlocks a locked level of a game when a compete set of graphical image symbols associated with that locked level is accumulated such that a graphical image associated with that locked level is displayed. For instance, in one example embodiment, the gaming system is configured to operate a game at one of a plurality of different levels, each of which has a different theme. In this example embodiment, for each play of the game, the gaming system enables the player to choose one of the unlocked levels (and, therefore, one of the themes) at whir to play that play of the game. In this example embodiment the gaming system unlocks a locked level and enables the player to selectively play the game at that looked level when a complete set of graphical image symbols associated with that locked level is accumulated such that a graphical image associated with that locked level is displayed. In various embodiments, the different levels are associated with a story or narrative and unlocking a particular level advances the story or narrative.

In another embodiment, the gaming system provides an item usable in one or more future plays of a game when a complete set of graphical image symbols associated with that item is accumulated such that a graphical image associated with that item is displayed. For instance, in one example embodiment in which the gaming system is configured to operate a battle bonus game (such as the example embodiment described below with respect to FIGS. 4A to 4F), the gaming system provides the player a weapon for use in the battle bonus game when a complete set of graphical image symbols associated with that weapon is accumulated such that a graphical image associated with that weapon is displayed.

In a further embodiment, the gaming system adds a new symbol (such as a new game symbol or a new graphical image symbol) to at least one of the reefs (or replaces at least one existing symbol on at least one of the reels with that new symbol) for one or more future plays of a game when a complete set of graphical image symbols associated with that symbol is accumulated such that a graphical image associated with that symbol is displayed. For instance, in one example embodiment in which the gaming system is configured to operate a slot game, the gaming system adds a Wild symbol to at least one of the reels for use in one or more future plays of the slot game when a complete set of graphical image symbols associated with that Wild symbol accumulated such that a graphical image associated with that Wild symbol is displayed.

In another embodiment, the gaming system provides an additional game character usable in one or more future plays of a game when a compete set of graphical image symbols associated with that game character is accumulated such that a graphical image associated with that game character is displayed. For instance, in one example embodiment in which the gaming system is configured to operate a battle bonus game in which a player character bathes an opponent character (such as the example embodiment described below with respect to FIGS. 4A to 4F), the gaming system unlocks an additional character usable by the player and/or an additional character usable by the opponent in the battle bonus game when a complete set of graphical image symbols associated with that character is accumulated such that a graphical image associated with that character is displayed.

In a further embodiment, the gaming system provides a new advantageous feature for a bonus game when a complete set of graphical image symbols associated with that new advantageous feature, is accumulated such that a graphical image associated with that new advantageous feature is displayed. For instance, in one example embodiment in which the gaming system is configured to operate a path-based bonus game, the gaming system adds an advancement space to a game board (that, if landed an causes the players game piece to move further than normal around the game board) when a complete set of graphical image symbols associated with that advancement space symbol is accumulated such that a graphical image associated with that advancement space is displayed.

In another embodiment, the gaming system provides an additional game theme when a complete set of graphical image symbols associated with that game theme is accumulated such that a graphical image associated with that game theme is displayed. For instance, in one example embodiment in which the gaming system is configured to operate a game, the gaming system unlocks an additional game theme when a complete set of graphical image symbols associated with that game theme is accumulated such that a graphical image associated with that game theme is displayed.

In a further embodiment, the gaining system replaces at least one instance of a particular symbol (such as a game symbol or a graphical image symbol) on at least one of the reels with a Wild symbol for one or more future plays of a game when a complete set of graphical image symbols associated with that particular symbol is accumulated such that a graphical image associated with that particular symbol is displayed. For instance, in one example embodiment in which the gaming system is configured to operate a slot game, the gaming system replaces each instance of a major symbol on the reels with a Wild symbol for one or more future plays of the slot game when a complete set of graphical image symbols associated with that major symbol (such as one graphical image symbol including that major symbol and the letter W, one graphical image symbol including that major symbol and the letter I, one graphical image symbol including that major symbol and the letter L, and one graphical image symbol including that major symbol and the letter D) is accumulated such that a graphical image associated with that major symbol is displayed.

In another embodiment, the gaming system unlocks a new complete set of graphical image symbols and adds those graphical image symbols to the reels when a complete set of graphical image symbols associated with that new set is accumulated such that a graphical image associated with that new set is displayed. For instance, in one example embodiment in which the gaming system is configured to operate a slot game, the gaming system unlocks a complete set of graphical image symbols associated with a progressive award when a complete set of graphical image symbols associated with that progressive award is accumulated such that a graphical image associated with that progressive award is displayed.

FIGS. 2A, 2B, 2C, 2D, 2E, and 2F illustrate screen shots of one example embodiment of the gaming system of the present disclosure during a gaming session of a player. In this example embodiment, the gaming system enables the player to play a slot game having a plurality of different sequential levels. Initially, one of the levels is unlocked and each of the remaining levels is locked. Each locked level is associated with a complete set of graphical image symbols that, when collectively displayed, form a graphical image that represents or is otherwise associated with that locked level. Generally, in operation of this example embodiment, the gaming system enables the player to accumulate graphical image symbols associated with a next locked level (if any) in the sequence of levels through play of the slot game at an unlocked level, and displays any accumulated graphical image symbols. When the player accumulates the complete set of graphical image symbols associated with the next locked level, the gaming system unlocks the next locked level and enables the player to play the slot game at that (now) unlocked next level. Put differently, in this example embodiment, the gaming system enables the player to accumulate graphical image symbols to unlock one locked level at a time and, when that locked level is unlocked, immediately and automatically provides the slot game at the (now) unlocked level.

More specifically, in this example embodiment, the slot game is associated with an initially-unlocked first level and initially-locked sequential second and third levels. Here, the second level is associated with a first complete set of a plurality of graphical image symbols, each of which is associated with or represents a different portion of a background employed during, play of the slot game at the second level such that, when collectively displayed, the graphical image symbols of the first complete set form the background employed during play of the slot game at the second level. Similarly, the third level is associated with a second different complete set of a plurality of graphical image symbols, each of which is associated with a different portion of a background employed during play of the slot game at the third level such that, when collectively displayed, the graphical image symbols of the second set form the background employed during play of the slot game at the third level.

In this example embodiment, the gaming system enables the player to accumulate the graphical image symbols of the first complete set during play of the slot game at the first level to unlock the locked second level. Accordingly, the gaming system employs a first plurality of symbols including the graphical image symbols of the first complete set and a plurality of different game symbols during play of the slot game at the first level. Additionally, in this example embodiment, the gaming system enables the player to accumulate the graphical image symbols of the second complete set during play of the slot game at the second level to unlock the locked third level. Accordingly, the gaming system employs a second different plurality of symbols including the graphical image symbols of the second set and a plurality of different game symbols during play of the slot game at the second level.

Additionally, in this example embodiment, each locked level is associated with a beneficial feature that is not found in any other level of the slot game and that is employed during play of the slot game at that level (after that level is unlocked). Here, the second level is associated with an expanding wilds feature and the third level is associated with a multiplier will feature. It should thus be appreciated that, in this example embodiment, the gaming system of the present disclosure encourages the player to continue playing the slot game to accumulate graphical image symbols so that the player may unlock the locked levels and take advantage of the beneficial, unique features associated with those locked levels after they are unlocked.

It should thus be appreciated that, in this example embodiment: (a) the gaming system initially provides the slot game at the first level employing the first plurality of symbols (Which includes the graphical image symbols of the first complete set); (b) if the player accumulates the first complete set of graphical image symbols during play of the slot game at the first level, the gaming system unlocks the second level and provides the slot game at the second level employing the second plurality of symbols (which includes the graphical image symbols of the second complete set) and the expanding wilds feature; and (c) if the player accumulates the second complete set of graphical image symbols during play of the slot game at the second level, the gaming system unlocks the third level and provides the slot game at the third level employing a third plurality of symbols.

The gaming system displays, such as on a display device 1116 or 1118 (described below), a first set 210 of a plurality of symbol display areas, including symbol display areas 210*a*, 210*b*, 210*c*, 210*d*, 210*e*, 210*f*, 210*g*, 210*h*, 210*i*, 210*j*, 210*k*; 210*l*, 210*m*, 210*n*, and 210*o* arranged in a 3×5 grid or matrix. The gaming system displays a plurality of reels 205*a*, 205*b*, 205*c*, 205*d*, and 205*e*, each of which is associated with a plurality of whichever plurality of symbols the gaming system employs for a particular play of the slot game based on the particular level at which the slot game is played. Each of the teats 205*a*, 205*b*, 205*c*, 205*d*, and 205*e* is associated with, and configured to display symbols at, a plurality of the first symbol display areas of the first set 210. More specifically: (a) the reel 205*a* is associated with, and configured to display symbols at, the first symbol display areas 210*a*, 210*f*, and 210*k*; (b) the reel 205*b* is associated with, and configured to display symbols at, the first symbol display areas, 210*b*, 210*g*, and 210*l*; (c) the reel 205*c* is associated with, and configured to display symbol's at, the first symbol display areas 210*o*, 210*h*, and 210*m*; (d) the reel 205*d* is associated with and configured to display symbols at, the first symbol display areas 210*d*, 210*i*, and 210*n*; and (e) the reel 205*e* is associated with; and configured to display symbols at, the first symbol display areas 210*e*, 210*j*, and 210*o*.

The gaming system displays a plurality of paylines 215*a*, 215*b*, and 215*c*, each of which is associated with a different plurality of the first symbol display areas of the first set 210. More specifically: (a) the payline 215*a* is associated with the first symbol display areas 210*a*, 210*b*, 210*c*, 210*d*, and 210*e*; (b) the payline 215*b* is associated with the first symbol display areas 210*f*, 210*g*, 210*h*, 210*i*, and 210*j*; and (c) the payline 215*c* is associated with the first symbol display areas 210*k*, 210*l*, 210*m*, 210*n*, and 210*o*.

The gaming system also displays a second different set 240 of a plurality of symbol display areas, including symbol display areas 240*a*, 240*b*, 240*c*, 240*d*, 240*e*, 240*f*, 240*g*, 240*h*, 240*i*, 240*j*, 240*k*, 240*l*, 240*m*, 240*n*, and 240*o* arranged in a 3×5 grid or matrix. In this example embodiment, each of the second symbol display areas of the second set 240 is associated with, and configured to display, a different one of the graphical image symbols (if any) included in the plurality of symbols employed for the play of the slot game. Put differently, in this example embodiment, for each second symbol display area of the second set 240, the gaming system is configured to display a particular one of the graphical image symbols (if any) in the plurality of symbols employed for the slot game at a particular level (i.e., the graphical image symbol associated with that symbol display area). In this example embodiment, for each second symbol display area of the second set 240, if the graphical image symbol associated with that symbol display area has not been accumulated, the gaming system displays a phantom or dashed representation of the graphical image symbol associated with that symbol display area al that symbol display area, though in other embodiments the gaming system does not display such phantom or dashed representations.

In this example embodiment, the associations between the graphical image symbols and the second symbol display areas of the second set 240 configured to display those graphical image symbols are determined such that when the complete sot of graphical image symbols are accumulated and displayed at their associated second symbol display areas of the second set 240 the displayed graphical image symbols form the graphical image.

Additionally, in this example embodiment each of the first symbol display areas of the first set 210 is associated with or corresponds to a different one of the second symbol display areas of the second set 240. More specifically: (a) the first and second symbol display areas 210*a* and 240*a* are associated with one another, (b) the first and second symbol display areas 210*b* and 240*b* are associated with one another, (c) the first and second symbol display areas 210*c* and 240*c* are associated with one another, (d) the first and second symbol display areas 210*d* and 240*d* are associated with one another, (e) the first and second symbol display areas 210*e* and 240*e* are associated with one another, (f) the first and second symbol display areas 210*f* and 240*f* are associated with one another (g) the first and second symbol display areas 210*g* and 240*g* are associated with one another, (h) the first and second symbol display areas 210*h* and 240*h* are associated with one another, (i) the first and second symbol display areas 210*i* and 240*h* are associated with one another, (j) the first and second symbol display areas 210*j* and 240*j* are associated with one another, (k) the first and second symbol display areas 210*k* and 240*j* are associated with one another, (l) the first and second symbol, display areas 210*l* and 240*l* are associated with one another, (m) the first and second symbol display areas 210*m* and 240*m* are associated with one another, (n) the first and second symbol display areas 210*n* and 240*n* are associated with one another, and (o) the first and second symbol display areas 210*o* and 240*o* are associated with one another.

In this example embodiment, the gaming system accumulates a graphical image symbol displayed at one of the first symbol display areas of the first set 210 if: (a) the graphical image symbol displayed at that first symbol display area of the first set 210 and that first symbol display area of the first set 210 are both associated with the same second symbol display area of the second set 240, and (b) a graphical image symbol is not displayed at the second symbol display area of the second set 240 with which the graphical image symbol displayed at that first symbol display area of the first set 210 and that first symbol display area of the first set 210 are associated. Thus, in this example embodiment, for the gaming system to accumulate a particular graphical image symbol, that graphical image symbol must be displayed at a particular first symbol display area of the first set 210. For instance, if a first graphical image symbol that is associated with the second symbol display area 240*a* of the second set 240 is displayed at the first symbol display area 210*a* of the first set 210 (which is associated with the second symbol display area 240*a* of the second set 240) and a graphical image symbol is not displayed at the second symbol display area 240*a* of the second set 240, the gaming system accumulates the first graphical image symbol. If, on the other hand, the first graphical image symbol is displayed at the first symbol, display area 210*b* of the first set 210 (which is not associated with the second symbol display area 240*a* of the second set 240), the gaming system does not accumulate the first graphical image symbol.

The gaming system also displays: (a) a message box 260 in which the gaming system displays a variety of messages or indications before, during, or after play of the slot game; (b) a plurality of meters including: (i) a credit meter 270 in which the gaming system displays the player's credit balance (in credit or currency form), (ii) a wager or bet meter 280 that displays any wager or bet placed on a play of the slot game (in credit or currency form), and (iii) an award meter 290 that displays any awards won for the play of the slot game (in credit or currency form); and (c) a spin button 294 that, when actuated by the player, causes the gaming system to initiate a play of the slot game. While in this illustrated example embodiment the gaming system indicates the player's credit balance, any wagers, and any awards in the form of amounts of currency, it should be appreciated that such indications may alternatively or additionally be made in the form of amounts of credits.

Figure 2A:
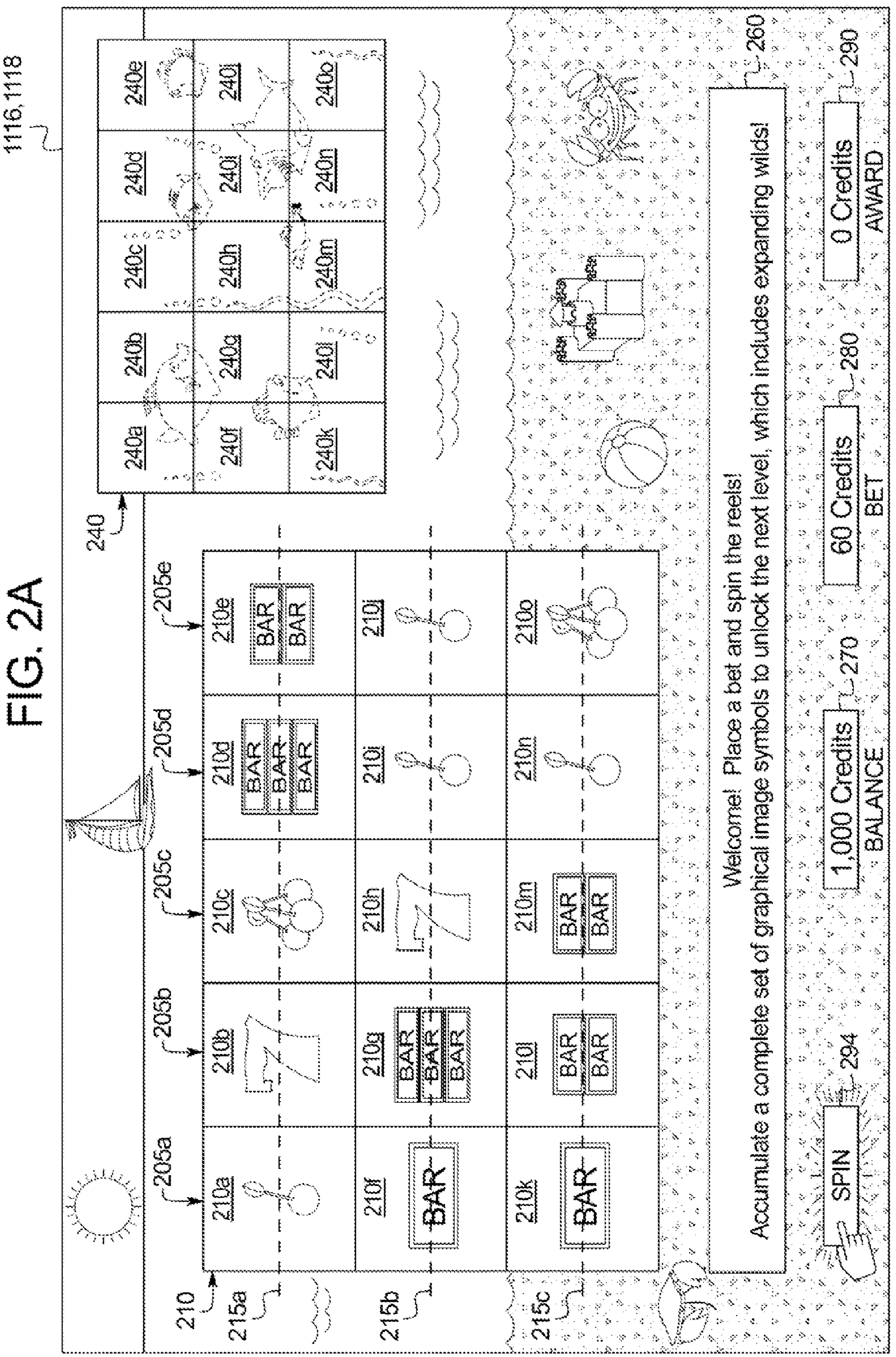
FIGS. 2A, 2B, 2C, 2D, 2E, and 2F illustrate screen shots of one example embodiment of the gaming system of the present disclosure during a gaming session of a player.

Turning to FIG. 2A, upon initiation of the gaming session, the gaming system: (a) enables the player to play the slot game at the first level; (b) employs the first plurality of symbols including the graphical image symbols of the first complete set and a plurality of game symbols dun play of the slot game at the first level; and (c) for each second symbol display area of the second set 240, displays a phantom or dashed representation of the graphical image symbol of the first complete set associated with that symbol display area at that symbol display area. The gaming system receives a wager of 60 credits from the player (as shown in the bet meter 280) and receives an actuation of the spin button 294. The gaming system displays the following message in the message box 260: "WELCOME! PLACE A BET AND SPIN THE REELS! ACCUMULATE A COMPLETE SET OF GRAPHICAL IMAGE SYMBOLS TO UNLOCK THE NEXT LEVEL, WHICH INCLUDES EXPANDING WILDS!"

It should be appreciated that the player's gaming session may include any suitable period, such as a period of time or a quantity of plays of a game, that starts and ends upon the occurrence of any suitable events. In one embodiment the gaming system initiates the player's gaming session upon receiving a deposit of value from the player when the player establishes a credit balance on the gaming system) and ends the players gaming session when the player's credit balance reaches 0 credits, to another embodiment, the gaming system initiates the players gaming session upon detecting that a player tracking card of the player was inserted into the gaming system and ends the player's gaming upon detecting that the player tracking card has been removed from the garbing system. In another embodiment, the gaming system initiates the players gaming session upon receiving a deposit of value from the player and ends the players gaming session if them is no activity for a designated period of time. In another embodiment, the gaming system initiates the players gaming session upon receiving a deposit of value from the player and ends the player's gaming session if there is no activity for a designated period of time and the players credit balance is less than a designated number of credits (such as a minimum bet amount).

Figure 2B:
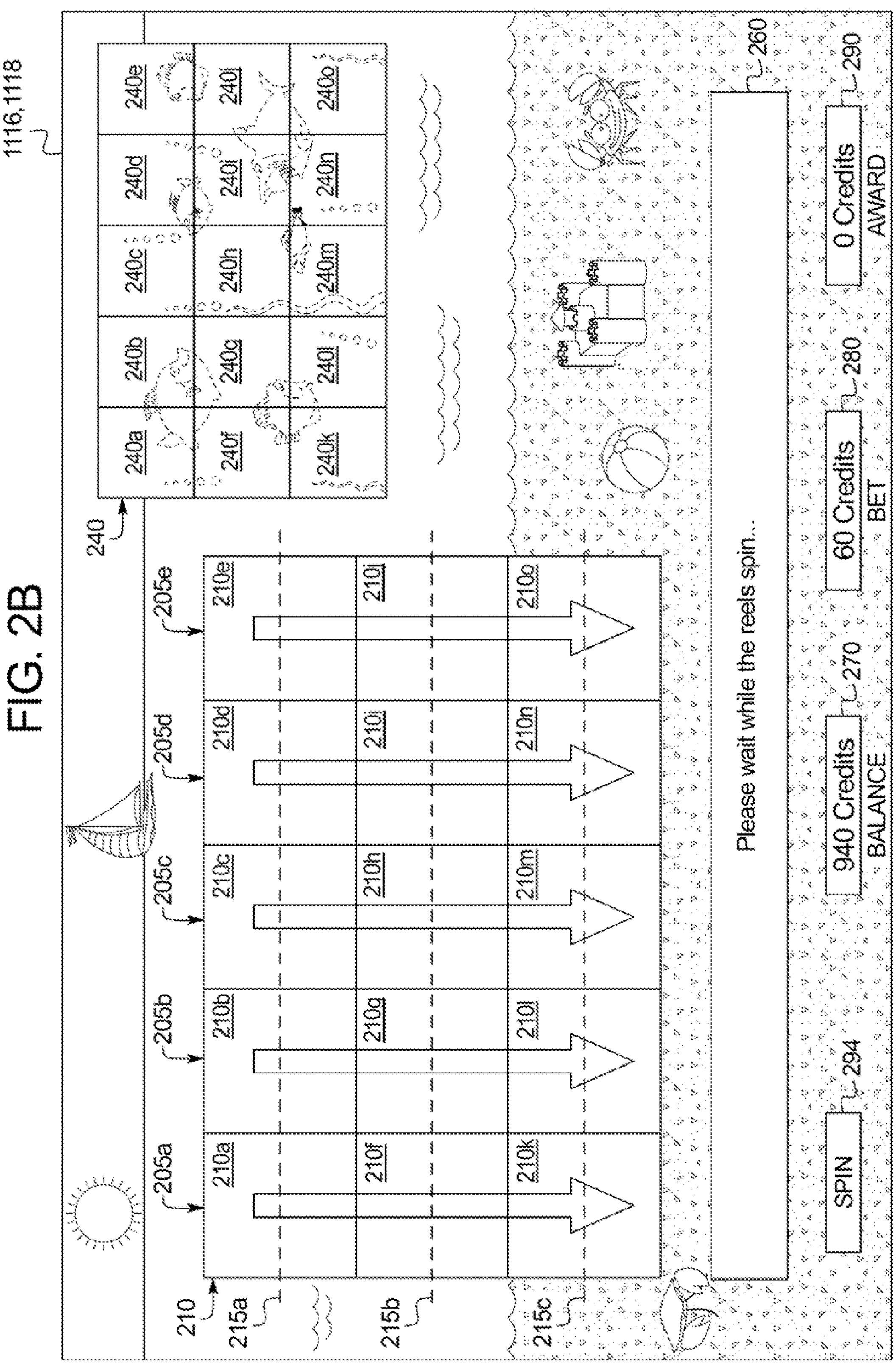

As illustrated in FIG. 2B, upon receiving the actuation of the spin button 294, the gaming system reduces the player's credit balance by the 60 credit wager (as shown in credit meter 270), initiates a play of the slot game at the first level, and spins the reels 205*a*, 205*b*, 205*c*, 205*d*, and 205*e*. The gaming system displays the following message in the message box 260: "PLEASE WAIT WHILE THE REELS SPIN . . . ".

Figure 2C:
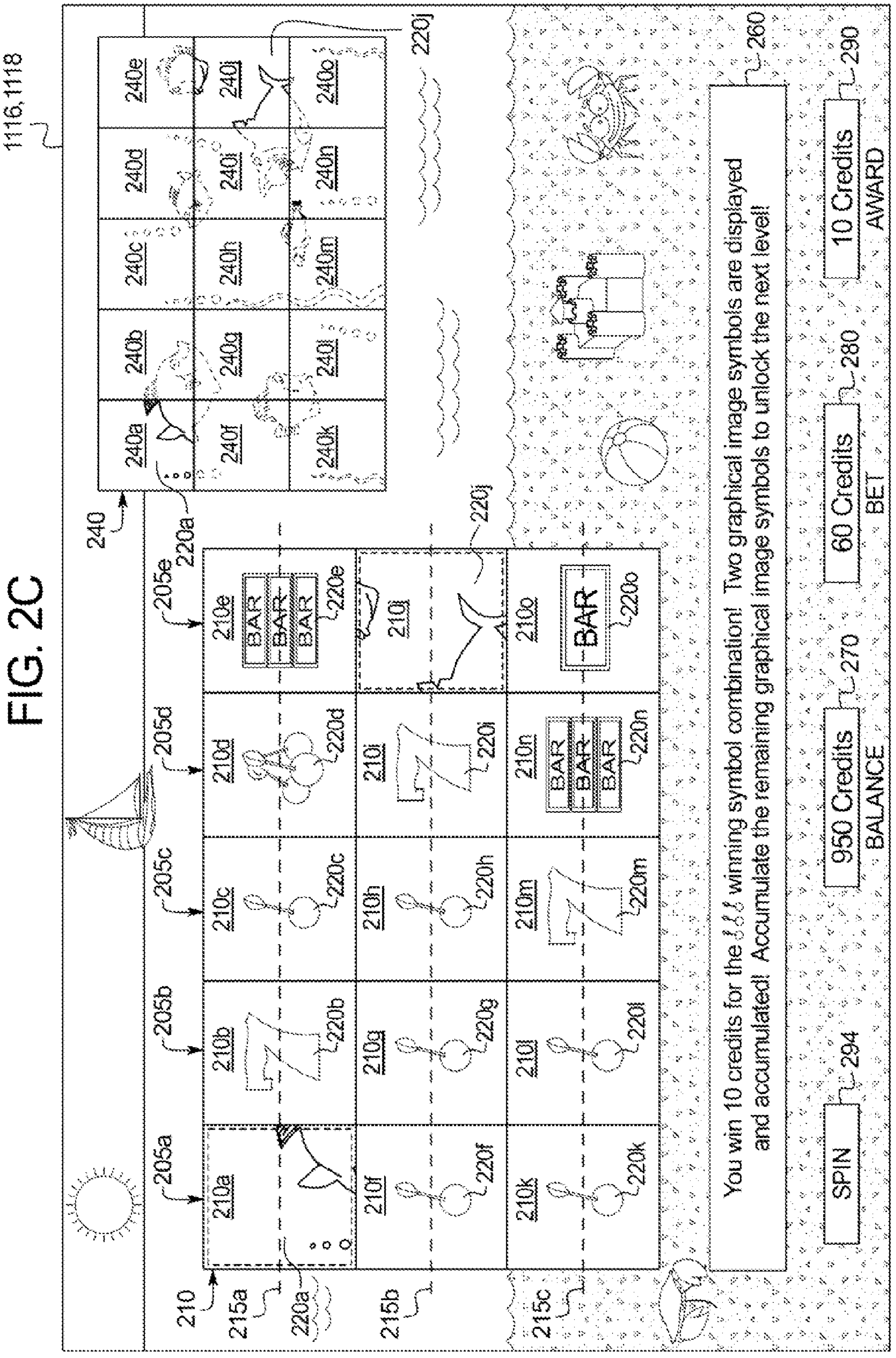

As illustrated in FIG. 2C, the gaming system stops the reels 205*a*, 205*b*, 205*c*, 205*d*, and 205*e* such that (a) graphical image, symbol 220*a* is displayed at the first symbol display area 210*a*, (b) Seven game symbol 220*b* is displayed at the first symbol display area 210*b*, (c) Cherry game symbol 220*c* is displayed at the first symbol display area 210*c*, (d) Triple Cherry game symbol 220*d* is displayed at the first symbol display area 210*d*, (e) Triple Bar game symbol 220*e* is displayed at the first symbol display area 210*e*, (f) Cherry game symbol 220*f* is displayed at the first symbol display area 210*f*, (g) Cherry game symbol 220*g* is displayed at the first symbol display area 210*a* (h) Cherry game symbol 220*h* is displayed at the first symbol display area 210*h*, (i) Seven game symbol 220*i* is displayed at the first symbol display area 210*i*, (j) graphical image symbol 220*j* is displayed at the first symbol display area 210*b* (k) Cherry game symbol 220*k* is displayed at the first symbol display area 210*k*, (l) Cherry game symbol 220*l* is displayed at the first symbol display area 210*l*, (m) Seven game symbol 220*m* is displayed at the first symbol display area 210*m*, (n) Triple Bar game symbol 220*n* is displayed at the first symbol display area 210*n*, and (o) Bar game symbol 220*o* is displayed at the first symbol display area 210*o*.

The gaming system determines any awards associated with the game symbols displayed at the first symbol display areas of the first set by determining whether any winning combinations of the game symbols included in a paytable (not shown) associated with the slot game are displayed along any of the wagered-oh paylines 215*a*, 215*b*, and/or 215*c*. In this example embodiment, the gaming system determines a 10 credit award associated with the winning symbol combination formed by the Cherry game symbol 220*f*, the Cherry game symbol 220*g* and the Cherry game symbol 220*h* displayed along the payline 210*b*. The gaming system displays the 10 credit award in the award meter no and updates the player's credit balance to reflect the 10 credit award.

The gaming system determines whether any graphical image symbols are displayed at any of the first symbol display areas of the first set 210. Here, the gaming system determines that two graphical image symbols 220*a* and 220*j* are respectively displayed at the first symbol display areas 210*a* and 210*j* of the first set 210. Accordingly, the gaming system determines, for each of those displayed graphical image symbols, whether to accumulate that graphical image symbol (as described above). With respect to the graphical image symbol 220*a*, the gaming system determines to accumulate the graphical image symbol 220*a* because: (a) the graphical image symbol 220*a* and the first symbol display area 210*a* of the first set 210 are both associated with the same symbol display area 240*a* of the second set 240, and (b) no graphical image symbol is displayed at the second symbol display area 240*a* of the second set 240. With respect to the graphical image symbol 220*j*, the gaming system determines to accumulate the graphical image symbol 220*j* because: (a) the graphical image symbol 220*j* and the first symbol display area 210*j* of the first set 210 are both associated with the same symbol display area 240*j* of the second set 240, and (b) no graphical image symbol is displayed at the second symbol display area 240*j* of the second set 240.

Accordingly, the gamin system: (a) accumulates the graphical image symbol 220*a*, (b) displays the accumulated graphical image symbol 220*a* at the second symbol display area 240*a* of the second set 240 with which the accumulated graphical image symbol 220*a* is associated, (c) accumulates the graphical image symbol 220*j*, and (d) displays the accumulated graphical image symbol 220*j* at the second symbol display area 240*j* of the second set 240 with which the accumulated graphical image symbol 220*j* is associated. In this example embodiment, the gaming system displays a graphical image symbol at the second symbol display area of the second set 240 with which that graphical image symbol is associated by "filling in" the phantom or dashed representation of that graphical image symbol displayed at that second symbol display area of second set 240 with solid lines.

The gaming system determines whether the first complete set of graphical image symbols has been accumulated. Here, the gaming system determines that the first complete set of graphical image symbols has not yet been accumulated. Put differently, the gaming system determines that the accumulated graphical image symbols displayed at the second symbol display areas of the second set 240 do not to the background employed during play of the slot game at the second level. The gaming system displays the following message in the message box 260: "YOU WIN 10 CREDITS FOR THE CHERRY-CHERRY-CHERRY WINNING SYMBOL COMBINATION! TWO GRAPHICAL IMAGE SYMBOLS ARE DISPLAYED AND ACCUMULATED! ACCUMULATE THE REMAINING GRAPHICAL IMAGE SYMBOLS TO UNLOCK THE NEXT LEVEL!"

Figure 2D:
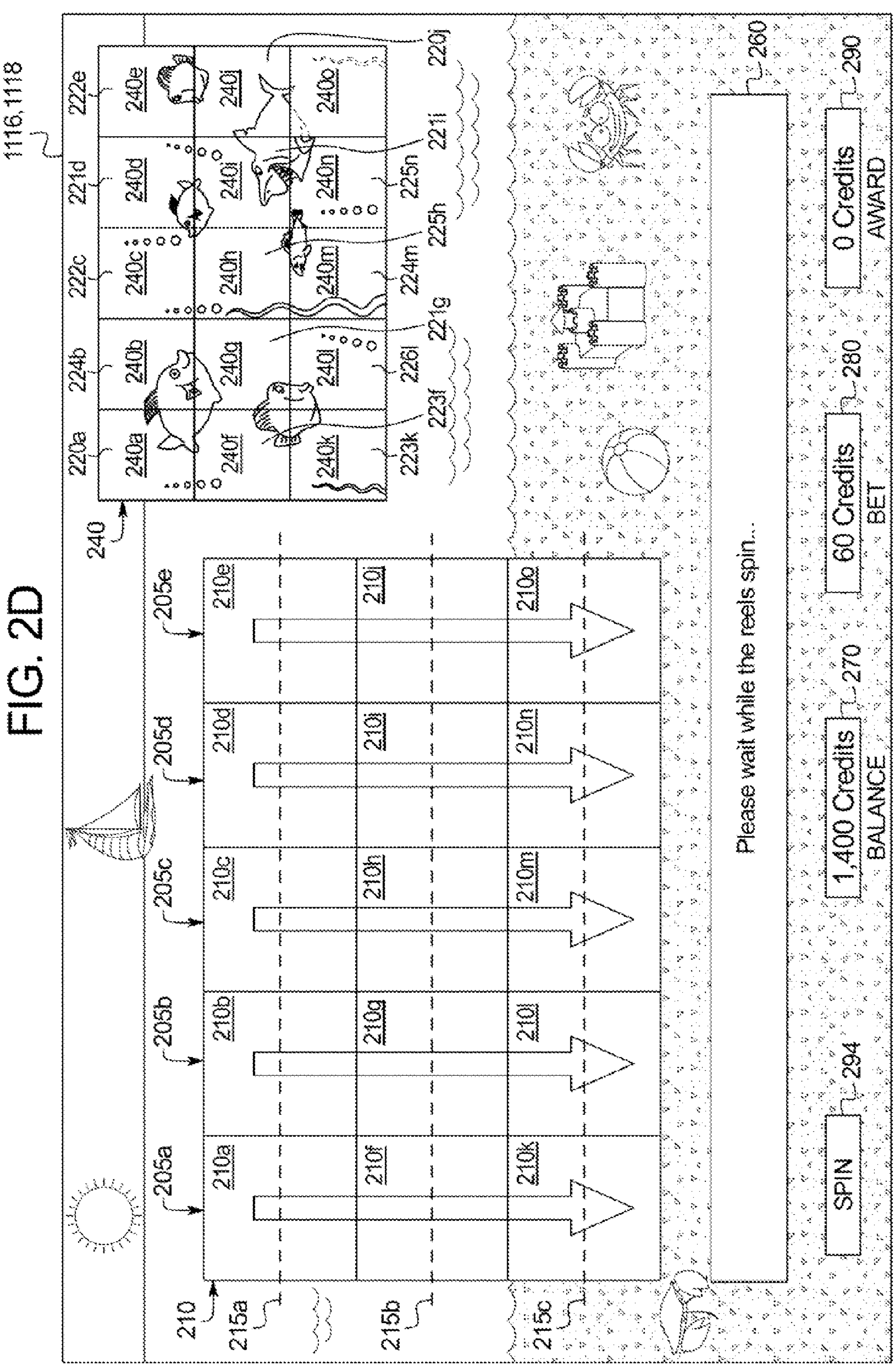

FIG. 2D illustrates a screenshot of the gaming system of this example embodiment after receiving another actuation of the spin button 294. At this point, the gaming system has: (a) provided six additional plays of the slot game at the first level following the play of the slot game described with respect to FIGS. 2A to 2C; (b) accumulated graphical image symbols 221*d*, 221*g*, 221*i*, 222*c*, 222*e*, 223*f*, 223*k*, 224*b*, 224*m*, 225*h*, 225*n*, and 226*l*, and (c) respectively displayed the accumulated graphical image symbols 221*d*, 221*g*, 221*i*, 222*c*, 222*e*, 223*f*, 223*k*, 224*b*, 224*m*, 225*h*, 225*n*, and 226*l* at their associated symbol display areas 240*d*, 240*g*, 240*i*, 240*c*, 240*e*, 240*f*, 240*k*, 240*b*, 240*m*, 240*h*, 240*n*, and 240*l* of the second set 240. Upon receiving the actuation of the spin button 294, the gaming system reduces the player's credit balance by the 60 credit wager (as shown in credit meter 270), initiates another play of the slot game at the first level, and spins the reels 205*a*, 205*b*, 205*c*, 205*d*, and 205*e*. The gaming system displays the following message in the message box 260: "PLEASE WAIT WHILE THE REELS SPIN . . . ".

Figure 2E:
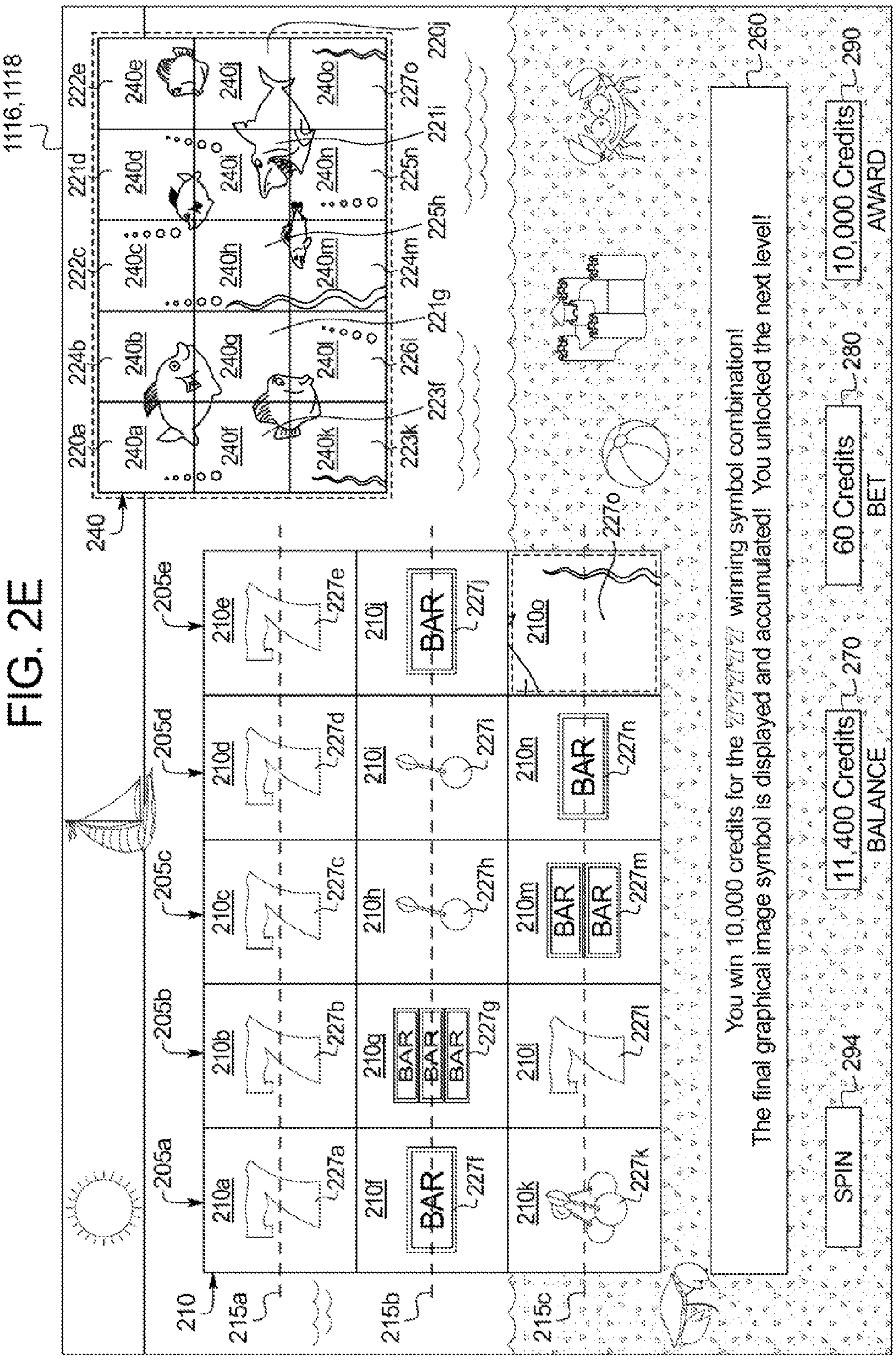

As illustrated in FIG. 2E, the gaming system stops the reels 205*a*, 205*b*, 205*c*, 205*d*, and 205*e* such that: (a) Seven game symbol 227*a* is displayed at the first symbol display area 210*a*, (b) Seven game symbol 227*b* is displayed at the first symbol display area 210*b*, (c) Seven game symbol 227*c* is displayed at the first symbol display area 210*c*, (d) Seven game symbol 227*d* is displayed at the first symbol display area 210*d*, (e) Seven game symbol 227*e* is displayed at the first symbol display area 210*e* (f) Bar game symbol 227*f* is displayed at the first symbol display area 210*f*, (g) Triple Bar game symbol 227*g* is displayed at the first symbol display area 210*g*, (h) Cherry game symbol 227*h* is displayed at the first symbol display area 210*h*, (i) Cherry game symbol 227*i* is displayed at the first symbol display area 210*i*, (j) Bar game symbol 227*j* is displayed at the first symbol display area 210*j*, (k) Triple Cherry game symbol 227*k* is displayed at the first symbol display area 210*k*, (l) Seven game symbol 227*l* is displayed at the first symbol display area 210*l*, (m) Double Bar game symbol 227*m* is displayed at the first symbol display area 210*m*, (n) Bar game symbol 227*n* is displayed at the first symbol display area 210*n*, and (o) graphical image symbol 227*o* is displayed at the first symbol display area 210*o*.

The gaming system determines any awards associated with the game symbols displayed at the first symbol display areas of the first set 210 by determining whether any winning combinations of the game symbols included in the paytable (not shown) associated with the slot game are displayed along any of the wagered-on paylines 215*a*, 215*b*, and/or 215*c*. In this example embodiment, the gaming system determines a 10,000 credit award associated with the winning symbol combination formed by the Seven game symbol 227*a*, the Seven game symbol 227*b*, the Seven game symbol 227*c*, the Seven game symbol 227*d*, and the Seven game symbol 227*e* displayed along the payline 210*a*. The gaming system displays the 10,000 credit award in the award meter 290 and updates the player's credit balance to reflect the 10,000 credit award.

The gaming system determines whether any graphical image symbols are displayed at any of the first symbol display areas of the first set 210. Here, the gaming system determines that one graphical image symbol 227*o* is displayed at the first symbol display area 210*o* of the first set 210. Accordingly, the gaming system determines for that displayed graphical image symbol, whether to accumulate that graphical image symbol as described above). The gaming system determines to accumulate the graphical image symbol 227*o* because: (a) the graphical image symbol 227*o* and the first symbol display area 210*o* of the first set 210 are both associated with the same symbol display area 240*o* of the second set 240, and (b) no graphical image symbol is displayed at the second symbol display area 240*o* of the second set 240. Accordingly, the gaming system: (a) accumulates the graphical image symbol 227*o*, and (b) displays the accumulated graphical image symbol 227*o* at the second symbol display area 240*o* of the second set 240 with which the accumulated graphical image symbol 227*o* is associated.

The gaming system determines whether the first complete set of graphical image symbols has been accumulated. Here, the gaming system determines that the first complete set of graphical image symbols has been accumulated. Put differently, the gaming system determines that the accumulated graphical image symbols displayed at the second symbol display areas of the second set 240 form the background employed during play of the slot game at the second level. The gaming system displays the following message in the message box 260: "YOU WIN 10,000 CREDITS FOR THE SEVEN-SEVEN-SEVEN-SEVEN-SEVEN WINNING SYMBOL COMBINATION! THE FINAL GRAPHICAL IMAGE SYMBOL IS DISPLAYED AND ACCUMULATED! YOU UNLOCKED THE NEXT LEVEL!"

Figure 2F:
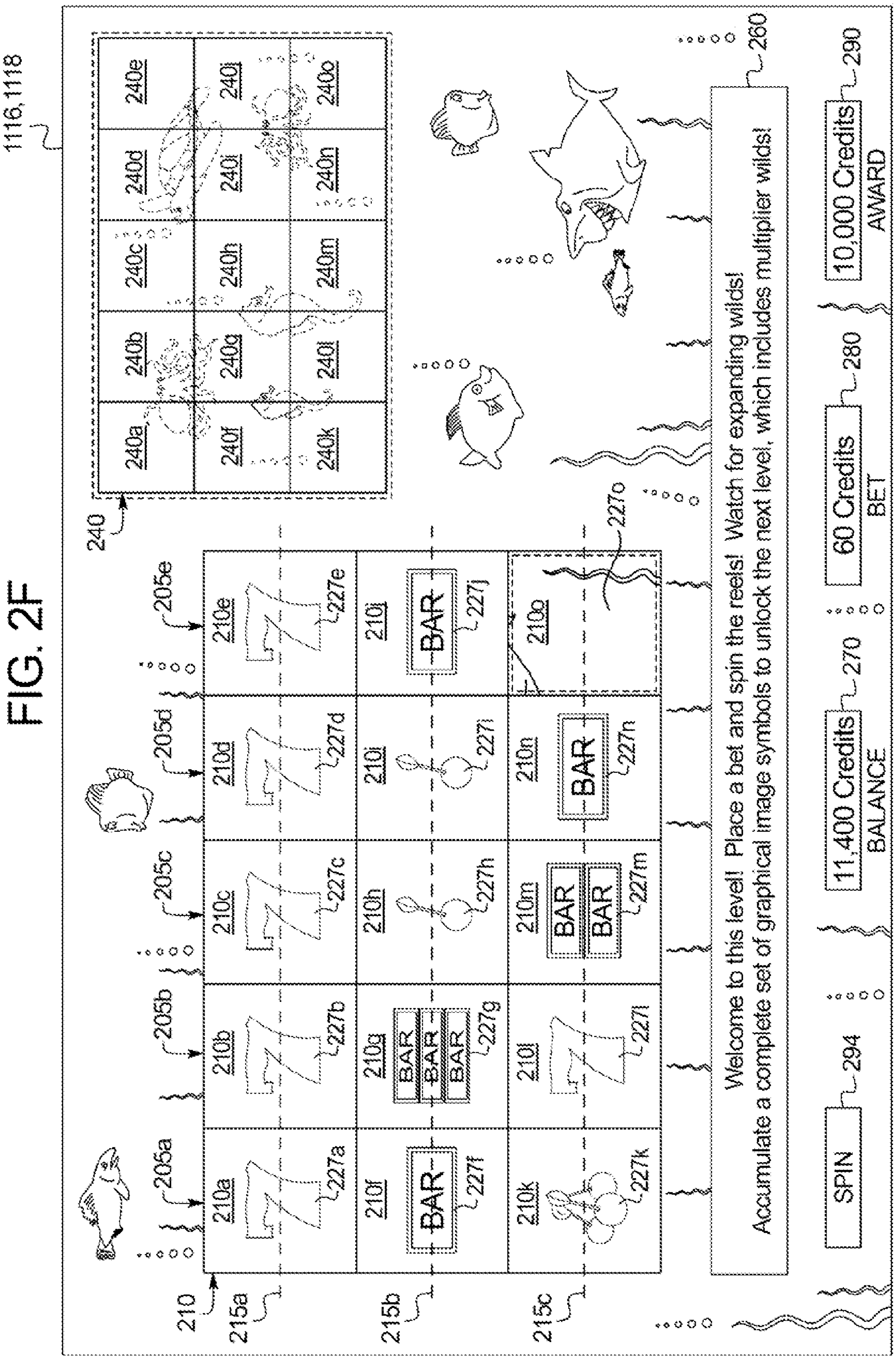

As illustrated in FIG. 2F, upon determining that the first complete set of graphical image symbols has been accumulated, the gaming system: (a) unlocks the locked second level, (b) enables the player to play the slot game at the second level; (c) employs the second plurality of symbols including the graphical image symbols of the second complete set during play of the slot game at the second level; (d) activates the expanding wads feature during play of the slot game at the second level; and (e) for each second symbol display area of the second set 240, displays a phantom or dashed representation of the graphical image symbol of the second complete set associated with that symbol display area at that symbol display area. The gaming system displays the following message in the message box 260: "WELCOME TO THIS LEVEL! PLACE A BET AND SPIN THE REELS! WATCH FOR EXPANDING WILDS! ACCUMULATE A COMPLETE SET OF GRAPHICAL IMAGE SYMBOLS TO UNLOCK THE NEXT LEVEL, WHICH INCLUDES MULTIPLIER WILDS!"

In certain embodiments, a plurality of different graphical image symbols are associated with the same second symbol display area of the second set. In these embodiments, the game is associated with a plurality of complete sets of the graphical image symbols. For instance, in one example embodiment, the game is associated with a plurality of complete sets of graphical image symbols that when displayed, form faces having different color eyes. More specifically, when the graphical image symbols of a first complete set are displayed, they form a face having blue eyes. When the graphical image symbols of a second complete set are displayed, they form an identical face having green eyes. When the graphical image symbols of a third complete set are displayed, they form an identical face having brown eyes. Thus, in this example embodiment, certain graphical image symbols (i.e., the non-eye graphical image symbols) are shared among the three complete sets, but each set includes a graphical image symbol not included in the other complete sets (i.e., each complete set includes different eye symbols).

Figure 3:
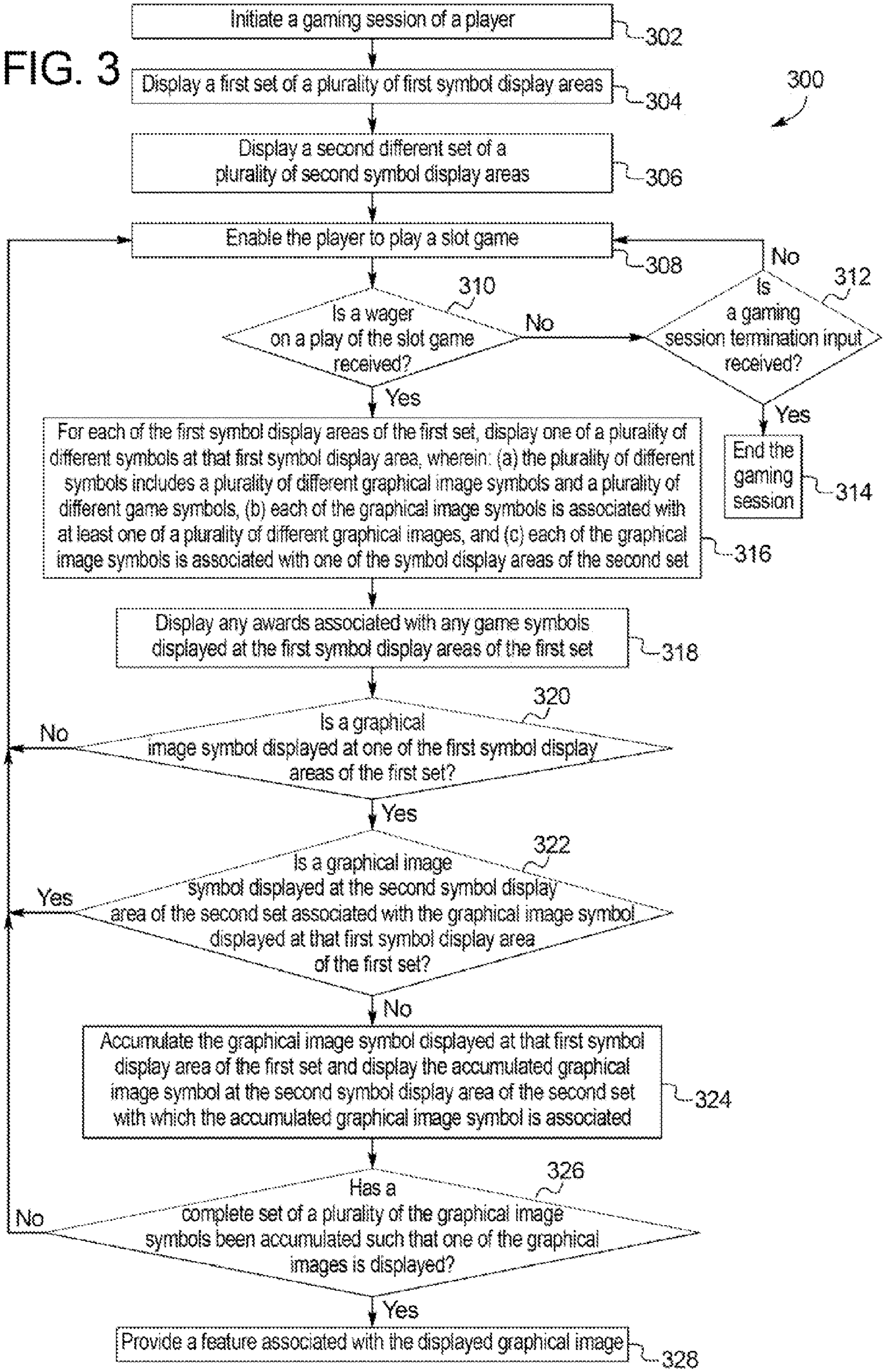
FIG. 3 is a flowchart illustrating an example method of operating another embodiment of the gaming system of the present disclosure.

FIG. 3 illustrates a flowchart of an example process or method 300 of operating another embodiment of the gaming system of the present disclosure. In various embodiments, the process 300 is represented by a set of instructions stored in one or more memories and executed by one or more processors. Although the process 300 is described with reference to the flowchart shown in FIG. 3, it should be appreciated that many other processes of performing the acts associated with this illustrated process 300 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the gaming system initiates a gaming session of a player, as indicated by block 302. The gaming system displays a first set of a plurality of symbol display areas, as indicated by block 304, and a second different set of a plurality of symbol display areas, as indicated by block 306. The gaming system enables the player to play a slot game, as indicated by block 308. The gaming system determines whether a wager on a play of the slot game was received, as indicated by diamond 310.

If the gaming system determines that a wager on a play of the slot game was not received, the gaming system determines whether a gaming session termination input was received, as indicated by diamond 312. If the gaming system determines that the gaming session termination input was received, the gaming system ends the gaming session, as indicated by block 314. If on the other hand, the gaming system determines that the gaming session termination input was not received, the process 300 returns to block 308.

Returning to diamond 310, if the gaming system determines that a wager on a play of the slot game was received, for each of the first symbol display areas of the first set, the gaming system displays one of a plurality of different symbols at that symbol display area, as indicated by block 316. In this example embodiment (a) the plurality of different symbols includes a plurality of different graphical image symbols and a plurality of game symbols, (b) each of the graphical image symbols is associated with or represents a portion of at least one of a plurality of different graphical images, and (c) each of the graphical image symbols is associated with one of the second symbol display areas of the second set. The gaming system displays any awards associated with any game symbols displayed at the first symbol display areas of the first set, as indicated by block 318.

The gaming system determines if a graphical image symbol is displayed at one of the first symbol display areas of the first set, as indicated by diamond 320, if the gaming system determines that a graphical image symbol is not displayed at any of the first symbol display areas of the first set, the process 300 returns to block 308. If, on the other hand, the gaming system determines that a graphical image symbol is displayed at one of the first symbol display areas of the first set, the gaming system determines whether a graphical image symbol is displayed at the second symbol display area of the second set associated with the graphical image symbol displayed at that first symbol display area of the first set, as indicated by diamond 322. If the gaming system determines that a graphical image symbol is displayed at the second symbol display area of the second set associated with the graphical image symbol displayed at that first symbol display area of the first set, the process 300 returns to block 308.

If, on the other hand, the gaming system determines that a graphical image symbol is not displayed at the second symbol display area of the second set associated with the graphical image symbol displayed at that first symbol display area of the first set, the gaming system: (a) accumulates the graphical image symbol displayed at that first symbol display area of the first set, and (b) displays the accumulated graphical image symbol at the second symbol display area of the second set with which the accumulated graphical image symbol is associated, as indicated by block 324.

The gaming system determines whether a complete set of the graphical image symbols has been accumulated such that one of the plurality of graphical images is displayed, as indicated by diamond 326. If the gaming system determines that the complete set of the graphical image symbols has not been accumulated, the process 300 returns to block 308. If, on the other hand, the gaming system determines that the complete set of the graphical image symbols has been accumulated such that one of the plurality of graphical images is displayed, the gaming system provides a feature associated with the displayed graphical image, as indicated by block 328.

FIGS. 4A, 4B, 4C, 4D, 4E, and 4F illustrate screen shots of another example embodiment of the gaming system of the present disclosure during a gaming session of a player. In this example embodiment, the gaming system enables the player to play a slot game and to trigger a battle bonus game through play of the slot game. Generally, in operation of this example embodiment, the gaming system enables the player to accumulate graphical image symbols associated with the battle bonus game through play of the slot game, and displays any accumulated graphical image symbols. When the player accumulates one of a plurality of complete sets of graphical image symbols, each of which is associated with a type of battle bonus game, the gaming system provides the battle bonus game of the type associated with the accumulated complete set of graphical image symbols.

In this example embodiment, each complete set of graphical image symbols includes: (a) thirteen common graphical image symbols, and (b) two character graphical image symbols that define or represent the type of battle bonus game with which that complete set is associated. Put differently, all of the complete sets include: (a) the same thirteen common graphical image symbols, and (b) a different set of two character graphical image symbols. For instance, in this example embodiment, each different type of battle bonus game includes a unique combination of a player character and an opponent character. A first type of battle bonus game includes a robot player character and a pirate opponent character and the complete set of graphical image symbols associated with the first type of bathe bonus game includes the thirteen common graphical image symbols, a robot graphical image symbol, and a pirate graphical image symbol. It should thus be appreciated that, in this example embodiment, the character graphical image symbols accumulated during play of the slot game determine the type of battle bonus game that will be triggered when a complete set of graphical image symbols is accumulated.

The gaming system displays a first set 410 of a plurality of symbol display areas; including symbol display areas 410*a*, 410*b*, 410*c*, 410*d*, 410*e*, 410*f*, 410*g*, 410*h*, 410*i*, 410*j*, 410*k*, 410*l*, 410*m*, 410*n*, and 410*o* arranged in a 3×5 grid or matrix. The gaming system displays a plurality of reels 405*a*, 405*b*, 405*c*, 405*d*, and 405*e* each of which is associated with a plurality of symbols employed for the slot game (including the graphical image symbols and a plurality of game symbols). Each of the reels 405*a*, 405*b*, 405*c*, 405*d*, and 405*e* is associated with, and configured to display symbols at, a plurality, of the first symbol display areas of the first set 410. More specifically: (a) the reel 405*a* is associated with, and configured to display symbols at, the first symbol display areas 410*a*, 410*f*, and 410*k*; (b) the reel 405*b* is associated with, and configured to display symbols at the first symbol display areas, 410*b*, 410*g*, and 410*l*; (c) the reel 405*c* is associated with, and configured to display symbols at, the first symbol display areas 410*c*, 410*h*, and 410*m*; (d) the reel 405*d* is associated with, and configured to display symbols at, the first symbol display areas 410*d*, 410*i*, and 410*n*, and (e) the reel 405*e* is associated with, and configured to display symbols at, the first symbol display areas 410*e*, 410*j*, and 410*o*.

The gaming system displays a plurality of paylines 415*a*, 415*b*, and 415*c*, each of which is associated with a different plurality of the first symbol display areas of the first set 410. More specifically: (a) the payline 415*a* is associated with the first symbol display areas 410*a*, 410*b*, 410*c*, 410*d*, and 410*e*; (b) the payline 415*b* is associated with the first symbol display areas 410*f*, 410*g*, 410*h*, 410*i*, and 410*j*; and (c) the payline 415*c* is associated with the first symbol display areas 410*k*, 410*l*, 410*m*, 410*n*, and 410*o*.

The gaming system also displays a second different set 440 of a plurality of symbol display areas, including symbol display areas 440*a*, 440*b*, 440*c*, 440*d*, 440*e*, 440*f*, 440*g*, 440*h*, 440*i*, 440*j*, 440*k*, 440*l*, 440*m*, 440*n*, and 440*o* arranged in a 3×5 grid or matrix. In this example embodiment, each of the second symbol display areas of the second set 440 is associated with, and configured to display, a at least one of the graphical image symbols included in the plurality of symbols. Put differently, in this example embodiment, for each second symbol display area of the second set 440, the gaming system is configured to display at least one of the graphical image symbols (if any in the plurality of symbols, in this example embodiment, symbol display areas 440*a*, 440*b*, 440*c*, 440*d*, 440*e*, 440*f*, 440*h*, 440*j*, 440*k*, 440*l*, 440*m*, 440*n*, and 440*o* are each associated with a different one of the common graphical image symbols, while symbol display areas 440*g* and 440*i* are each associated with the plurality of character graphical image symbols.

In this example embodiment, the associations between the graphical image symbols and the second symbol display areas of the second set 440 configured to display those graphic image symbols are determined such that when the graphical image symbols of a complete set are accumulated and displayed at their associated second symbol display areas of the second set 440, the displayed graphical image symbols form a graphical in associated with that complete set.

Additionally, in this example embodiment, each of the first symbol display areas of the first set 410 is associated with or corresponds to a different one of the second symbol display areas of the second set 440. More specifically: (a) the first and second symbol display areas 410*a* and 440*a* are associated with one another, (b) the first and second symbol display areas 410*b* and 440*b* are associated with one another, (c) the first and second symbol display areas 410*c* and 440*c* are associated with one another, (d) the first and second symbol display areas 410*d* and 440*d* are associated with one another, (e) the first and second symbol display areas 410*e* and 440*e* are associated with one another, (f) the first and second symbol display areas 410*f* and 440*f* are associated with one another, (g) the first and second symbol display areas 410*g* and 440*g* are associated with one another, (h) the first and second symbol display areas 410*h* and 440*h* are associated with one another, (i) the first and second symbol display areas 410*i* and 440*i* are associated with one another, (j) the first and second symbol display areas 410*j* and 440*j* are associated with one another, (k) the first and second symbol display areas 410*k* and 440*k* are associated with one another, (l) the first and second symbol display areas 410*l* and 440*l* are associated with one another, (m) the first and second symbol display areas 410*m* and 440*m* are associated with one another, (n) the first and second symbol display areas 410*n* and 440*n* are associated with one another, and (o) the first and second symbol display areas 410*o* and 440*o* are associated with one another.

In this example embodiment, the gaming system accumulates a graphical image symbol displayed at one of the first symbol display areas of the first set 410 if: (a) the graphical image symbol displayed at that first symbol display area of the first set 410 and that first symbol display area of the first set 410 are both associated with the same second symbol display area of the second set 440, and (b) a graphical image symbol is not displayed at the second symbol display area of the second set 440 with which the graphical image symbol displayed at that first symbol display area of the first set 410 and that first symbol display area of the first set 410 are associated. Thus, in this example embodiment, for the gaming system to accumulate a particular graphical image symbol, that graphical image symbol must be displayed at a particular first symbol display area of the first set 410. For instance, if a first graphical image symbol that is associated with the second symbol display area 440*a* of the second set 440 is displayed at the first symbol display area 410*a* of the first set 410 (which is associated with the second symbol display area 440*a* of the second set 440) and a graphical image symbol is not displayed at the second symbol display area 440*a* of the second set 440, the gaming system accumulates the first graphical image symbol. If, on the other hand, the first graphical image symbol is displayed at the first symbol display area 410*b* of the first set 410 (which is not associated with the second symbol display area 440*a* of the second set 440), the gaming system does not accumulate the first graphical image symbol.

The gaming system also displays: (a) a message box 460 in which the gaming system displays a variety of messages or indications before, during, or after play of the slot game; (b) a plurality of meters including: (i) a credit meter 470 in which the gaming system displays the players credit balance (in credit or currency form), (ii) a wager or bet meter 480 that displays any wager or bet placed on a play of the slot game (in credit or currency form), and (iii) an award meter 490 that displays any awards won for the play of the Slot game (in credit or currency form) and (c) a spin button 494 that, when actuated by the player, causes the gaming system to initiate a play of the slot game. While in this illustrated example embodiment the gaming system indicates the player's credit balance, any wagers, and any awards in the form of amounts of currency, it should be appreciated that such indications may alternatively or additionally be made in the form of amounts of credits.

Figure 4A:
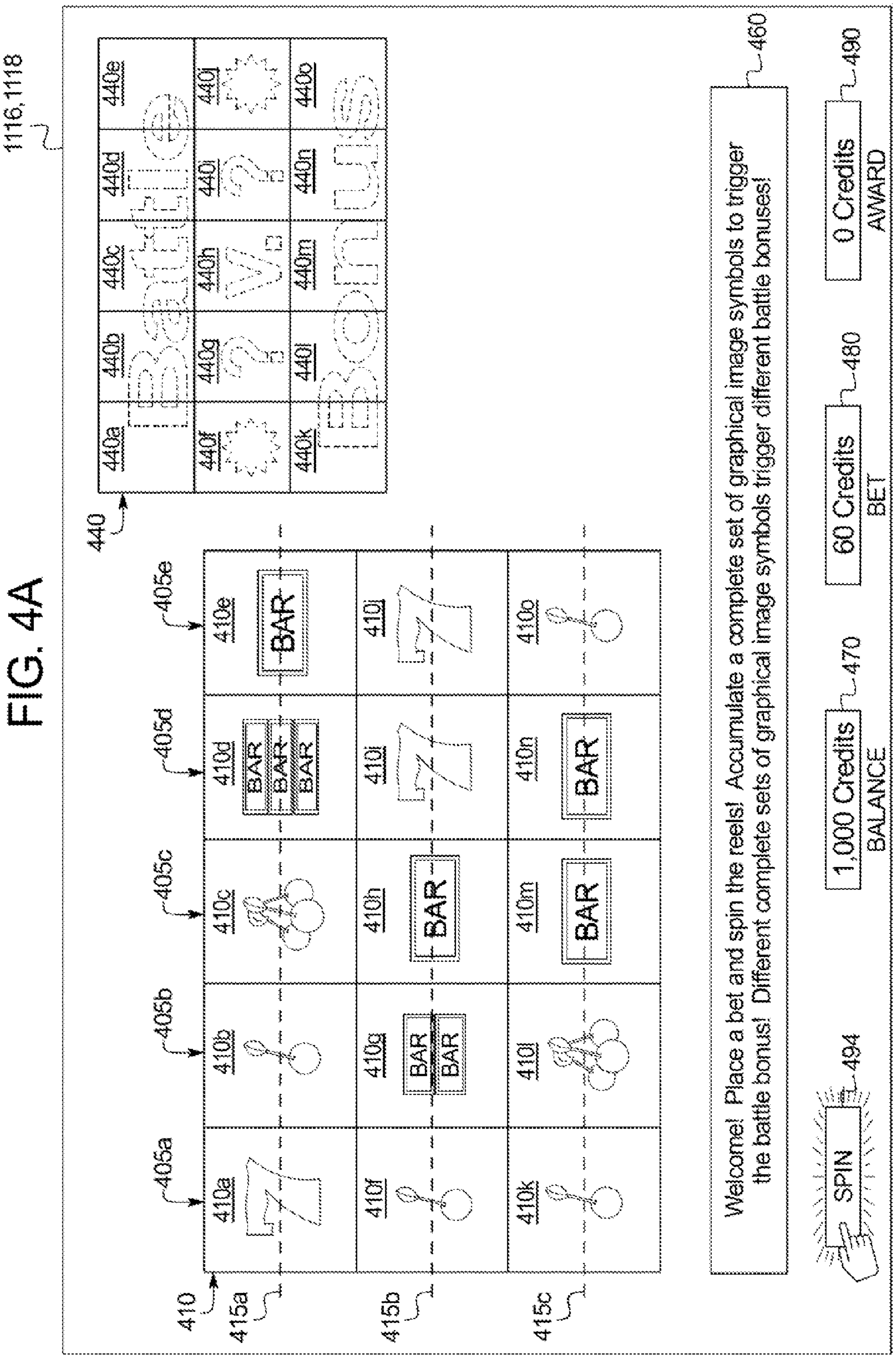
FIGS. 4A, 4B, 4C, 4D 4E, and 4F illustrate screen shots of another example embodiment of the gaming system of the present disclosure during a gaming session of a player.
Figure 4B:
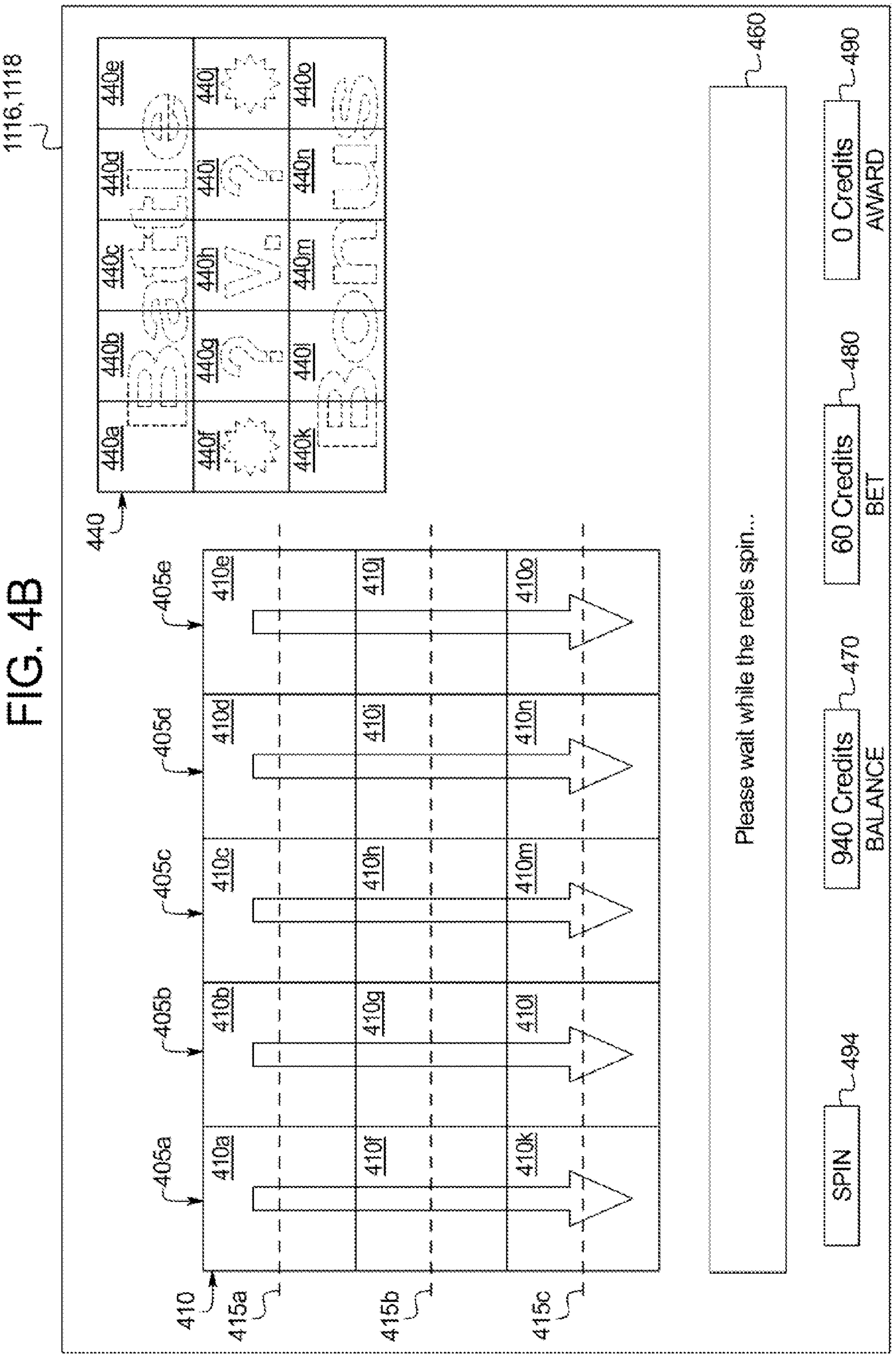

Turning to FIG. 4A, upon initiation of the gaming session, the gaming system: (a) enables the player to play the slot game; (b) for each second symbol display area of the second set 440 associated with one of the common graphical image symbols, displays a phantom or dashed representation of the common graphical image symbol associated with that symbol display area at that symbol display area and (c) for each second symbol display area of the second set 440 associated with the plurality of character graphical image symbols, displays a phantom or dashed representation of a question mark to indicate that any of the plurality of character graphical image symbols may be displayed at that symbol display area. The gaming system receives a wager of 60 credits from the player (as shown in the bet meter 480) and receives an actuation of the spin button 494. The gaming system displays the following message in the message box 460: "WELCOME! PLACE A BET AND SPIN THE REELS! ACCUMULATE A COMPLETE SET OF GRAPHICAL IMAGE SYMBOLS TO TRIGGER THE BATTLE BONUS! DIFFERENT COMPLETE SETS OF GRAPHICAL IMAGE SYMBOLS TRIGGER DIFFERENT BATTLE BONUSES"

As illustrated in FIG. 48, upon receiving the actuation of the spin button 494, the gaming system reduces the players credit balance by the 60 credit wager (as shown in credit meter 470), initiates a play of the slot game, and spins the reels 405*a*, 405*b*, 405*c*, 405*d*, and 405*e*. The gaming system displays the following message in the message box 460: "PLEASE WAIT WHILE THE REELS SPIN . . . ".

Figure 4C:
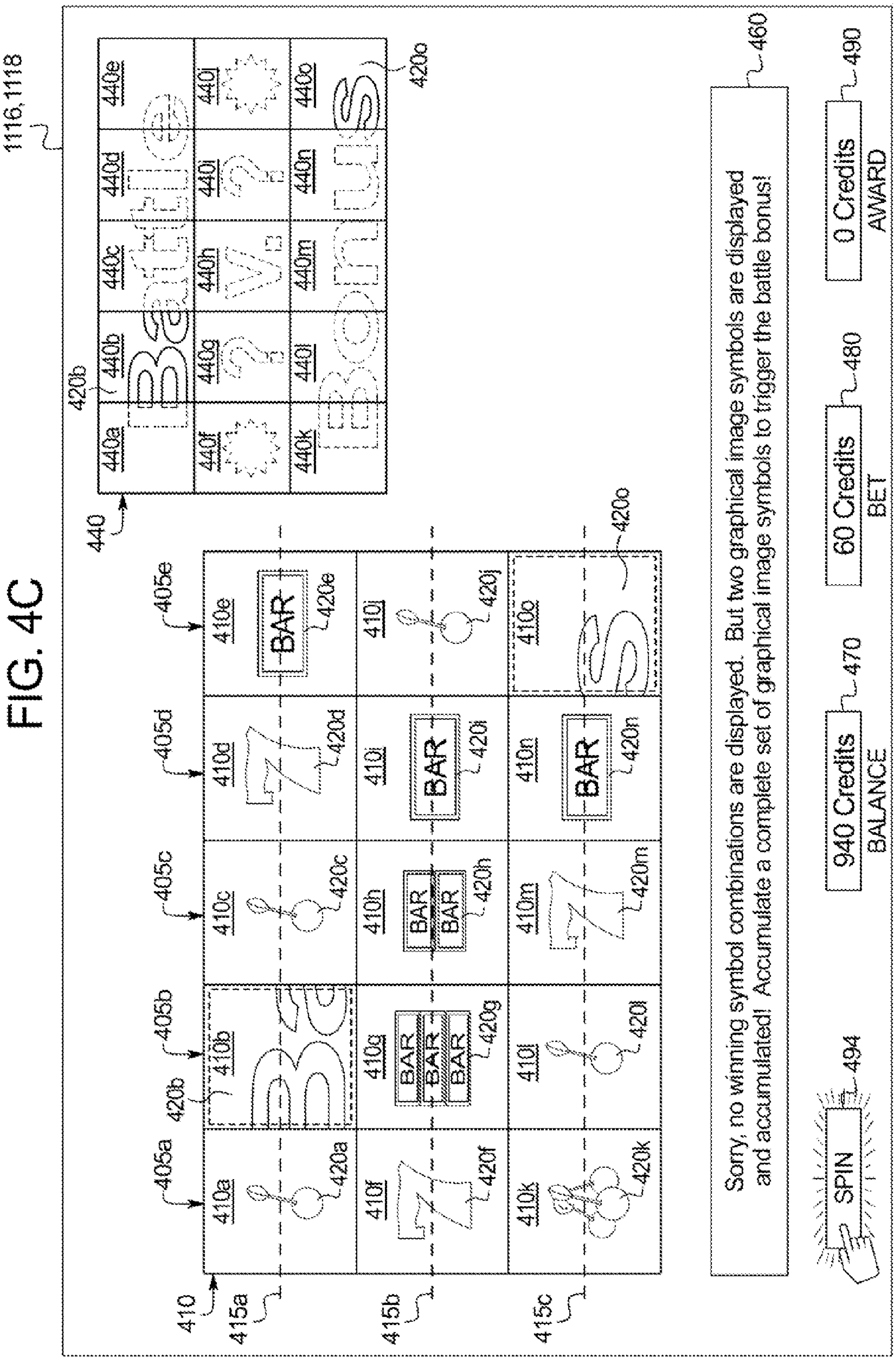

Illustrated in FIG. 4C, the gaming system stops the reels 405*a*, 405*b*, 405*c*, 405*d*, and 405*e* such that: (a) Cherry game symbol 420*a* is displayed at the first symbol display area 410*a*, (b) common graphical image symbol 420*b* is displayed at the first symbol display area 410*b*, (c) Cherry game symbol 420*c* is displayed at the first symbol display area 410*c*, (d) Seven game symbol 420*d* is displayed at the first symbol display area 410*d*, (e) Bar game symbol 420*e* is displayed at the first symbol display area 410*e*, (f) Seven game symbol 420*f* is displayed at the first symbol display area 410*f*, (g) Triple Bar game symbol 420*g* is displayed at the first symbol display area 410*g*, (h) Double Bar game symbol 420*h* is displayed at the first symbol display area 410*h* (i) Bar game symbol 420*i* is displayed at the first symbol display area 410*i*, (j) Cherry 420*j* is displayed at the first symbol display area 410*j*, (k) Triple Cherry game symbol 420*k* is displayed at the first symbol display area 410*k*, (l) Cherry game symbol 420*l* is displayed at the first symbol display area 410*l*, (m) Seven game symbol 420*m* is displayed at the first symbol display area 410*m*, (n) Bar game symbol 420*n* is displayed at the first symbol display area 410*n*, and (o) common graphical image symbol 420*o* is displayed at the first symbol display area 410*o*.

The gaming system determines any awards associated with the game symbols displayed at the first symbol display areas of the first set by determining whether any winning combinations of the game symbols included in a paytable (not shown) associated with the slot game are displayed along any of the wagered-on paylines 415*a*, 415*b*, and/or 415*c*. In this example embodiment the gaming system determines that no awards are associated with the game symbols displayed at the first symbol display areas of the first set.

The gaming system determines whether any graphical image symbols are displayed at any of the first symbol display areas of the first set 410. Here, the gaming system determines that two graphical image symbols 420*b* and 420*o* are respectively displayed at the first symbol display areas 410*b* and 410*o* of the first set 410. Accordingly, the gaming system determines, for each of those displayed graphical image symbols, whether to accumulate that graphical image symbol (as described above). With respect to the common graphical image symbol 420*b*, the gaming system determines to accumulate the common graphical image symbol 420*b* because: (a) the common graphical image symbol 420*b* and the first symbol display area 410*b* of the first set 410 are both associated with the same symbol display area 440*b* of the second set 440, and (b) no graphical image symbol is displayed at the second symbol display area 440*b* of the second set 440. With respect to the common graphical image symbol 420*o*, the gaming system determines to accumulate the common graphical image symbol 420*o* because: (a) the common graphical image symbol 420*o* and the first symbol display area 410*o* of the first set 410 are both associated with the same symbol display area 440*o* of the second set 440, and (b) no graphical image symbol is displayed at the second symbol display area 440*o* of the second set 440.

Accordingly, the gaming system: (a) accumulates the common graphical image symbol 420*b*, (b) displays the accumulated common graphical image symbol 420*b* at the second symbol display area 440*b* of the second set 440 with which the accumulated common graphical image symbol 420*b*is associated, (c) accumulates the common graphical image symbol 420*o*, and (d) displays the accumulated common graphical image symbol 420*o* at the second symbol display area 440*o* of the second set 440 with which the accumulated common graphical image symbol 420*o* is associated. In this example embodiment, the gaming system displays a graphical image symbol at the second symbol display area of the second set 440 with which that graphical image symbol is associated by "filling in" the phantom or dashed representation of that graphical image symbol displayed at that second symbol display area of the second set 440 with solid lines.

The gaming system determines whether any of the complete sets of graphical image symbols have been accumulated. Here, the gaming system determines that none of the complete sets of graphical image symbols have been accumulated. The gaming system displays the following message in the message box 460: "SORRY, NO WINNING SYMBOL COMBINATIONS ARE DISPLAYED, BUT TWO GRAPHICAL IMAGE SYMBOLS ARE DISPLAYED AND ACCUMULATED! ACCUMULATE A COMPLETE SET OF GRAPHICAL IMAGE SYMBOLS TO TRIGGER THE BATTLE BONUS!"

Figure 4D:
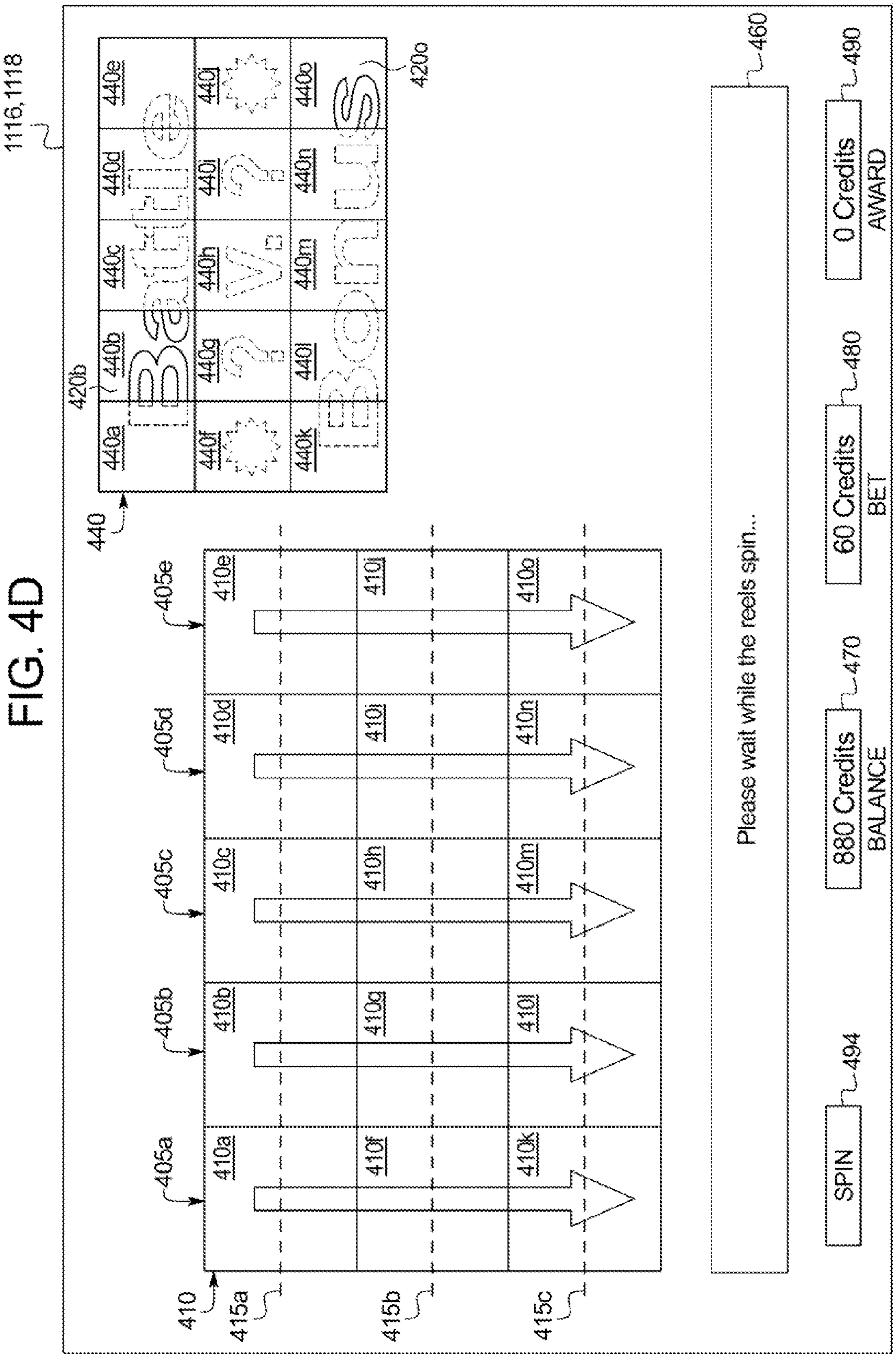

As also illustrated in FIG. 4C, the gaming system receives another actuation of the spin button 494. As shown in FIG. 4D, upon receiving the actuation of the spin button 494, the gaming system reduces the players credit balance by the 60 credit wager (as shown in credit meter 470), initiates another play of the slot game, and spins the reels 405*a*, 405*b*, 405*c*, 405*d*, and 405*e*. The gaming system displays the following message in the message box 460: "PLEASE WAIT WHILE THE REELS SPIN . . . ".

Figure 4E:
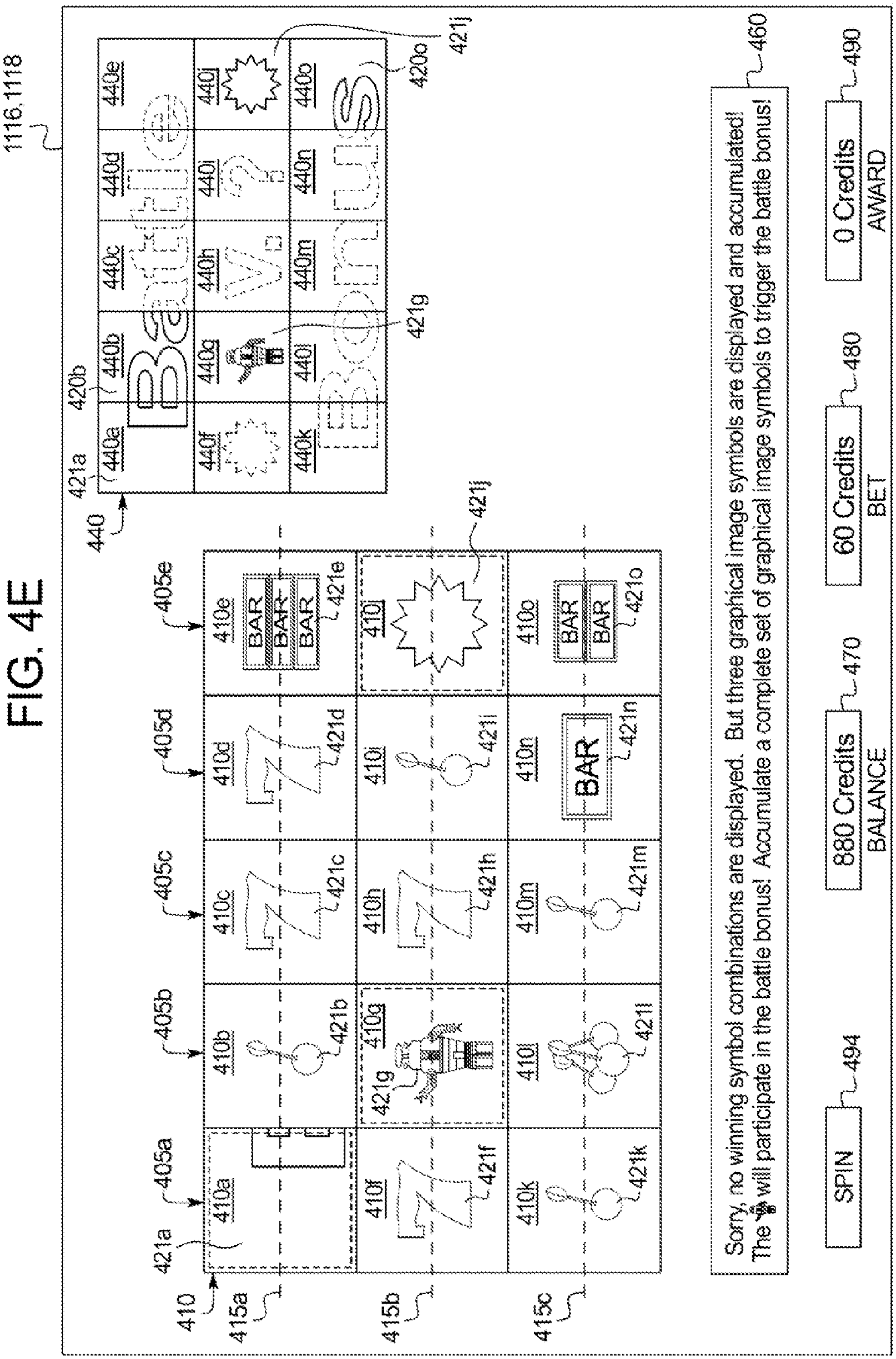

As illustrated in FIG. 4E, the gaming system stops the reels 405*a*, 405*b*, 405*c*, 405*d*, and 405*e* such that: (a) common graphical image symbol 421*a* is displayed at the first symbol display area 410*a*, (b) Cherry game symbol 421*b* is displayed at the first symbol display area 410*b*, (c) Seven game symbol 421*c* is displayed at the first symbol display area 410*c*, (d) Seven game symbol 421*d* is displayed at the first symbol display area 410*d*, (e) Triple Bar game symbol 421*e* is displayed at the first symbol display area 410*e*, (f) Seven game symbol 421*f* displayed at the first symbol display area 410*f*, (g) robot graphical image symbol 421*g* is displayed at the first symbol display area 410*g*, (h) Seven game symbol 421*h* is displayed at the first symbol display area 410*h* (i) Cherry game symbol 421*i* is displayed at the first symbol display area 410*i*, (j) common graphical image symbol 421*j* is displayed at the first symbol display area 410*j*, (k) Cherry game Symbol 421*k* is displayed at the first symbol display area 410*k*, (l) Triple Cherry game symbol 421*l* is displayed at the first symbol display area 410*l*, (m) Cherry game symbol 421*m* is displayed at the first symbol display area 410*m*, (n) Bar game symbol 421*n* is displayed at the first symbol display area 410*n* and (o) Double Bar game symbol 421*o* is displayed at the first symbol display area 410*o*.

The gaming system determines any awards associated with the game symbols displayed at the first symbol display areas of the first set by determining whether any winning combinations of the game symbols included in the paytable (not, shown) associated with the slot game are displayed along any of the wagered-on paylines 415*a*, 415*b*, and/or 415*c*. In this example embodiment, the gaming system determines that no awards are associated with the game symbols displayed at the first symbol display areas of the first set.

The gaming system determines whether any graphical image symbols are displayed at any of the first symbol display areas of the first set 410. Here, the gaming system determines that three graphical image symbols 421*a*, 421*g*, and 421*j* are respectively displayed at the first symbol display areas 410*a*, 410*g*, and 410*j* of the first set 410. Accordingly, the gaming system determines, for each of those displayed graphical image symbols, whether to accumulate that graphical image symbol (as described above). With respect to the common graphical image symbol 421*a*, the gaming system determines to accumulate the common graphical image symbol 421*a* because: (a) the common graphical image symbol 421*a* and the first symbol display area 410*a* of the first set 410 are both associated with the same symbol display area 440*a* of the second set 440, and (b) no graphical image symbol is displayed at the second symbol display area 440*a* of the second set 440. With respect to the robot graphical image symbol 421*g*, the gaming system determines to accumulate the robot graphical image symbol 421*g* because (a) the robot graphical image symbol 421*g* and the first symbol display area 410*g* of the first set 410 are both associated with the same symbol display area 440*g* of the second set 440, and (b) no graphical image symbol is displayed at the second symbol display area 440*g* of the second set 440. With respect to the common graphical image symbol 421*j*, the gaming system determines to accumulate the common graphical image symbol 421*j* because: (a) the common graphical image symbol 421*j* and the first symbol display area 410*j* of the first set 410 are both associated with the same symbol display area 440*j* of the second set 440, and (b) no graphical image symbol is displayed at the second symbol display area 440*j* of the second set 440.

Accordingly, the gaming system (a) accumulates the common graphical image symbol 421*a*, (b) displays the accumulated common graphical image symbol 421*a* at the second symbol display area 440*a* of the second set 440 with which the accumulated common graphical image symbol 421*a* is associated, (c) accumulates the robot graphical image symbol 421*g*, (d) displays the accumulated robot graphical image symbol 421*g* at the second symbol display area 440*g* of the second set 440 with which the accumulated robot graphical image symbol 421*g* is associated, (e) accumulates the common graphical image symbol 421*j*, and (f) displays the accumulated common graphical image symbol 421*j* at the second symbol display area 440*j* of the second set 440 with which the accumulated common graphical image symbol 421*j* is associated.

The gaming system determines whether any of the complete sets of graphical image symbols have been accumulated. Here, the gaming system determines that none of the complete sets of graphical image symbols have been accumulated. The gaming system displays the following message in the message box 460: "SORRY, NO WINNING SYMBOL COMBINATIONS ARE DISPLAYED, BUT THREE GRAPHICAL IMAGE SYMBOLS ARE DISPLAYED AND ACCUMULATED! THE ROBOT WILL PARTICIPATE IN THE BATTLE BONUS! ACCUMULATE A COMPLETE SET OF GRAPHICAL IMAGE SYMBOLS TO TRIGGER THE BATTLE BONUS!"

Figure 4F:
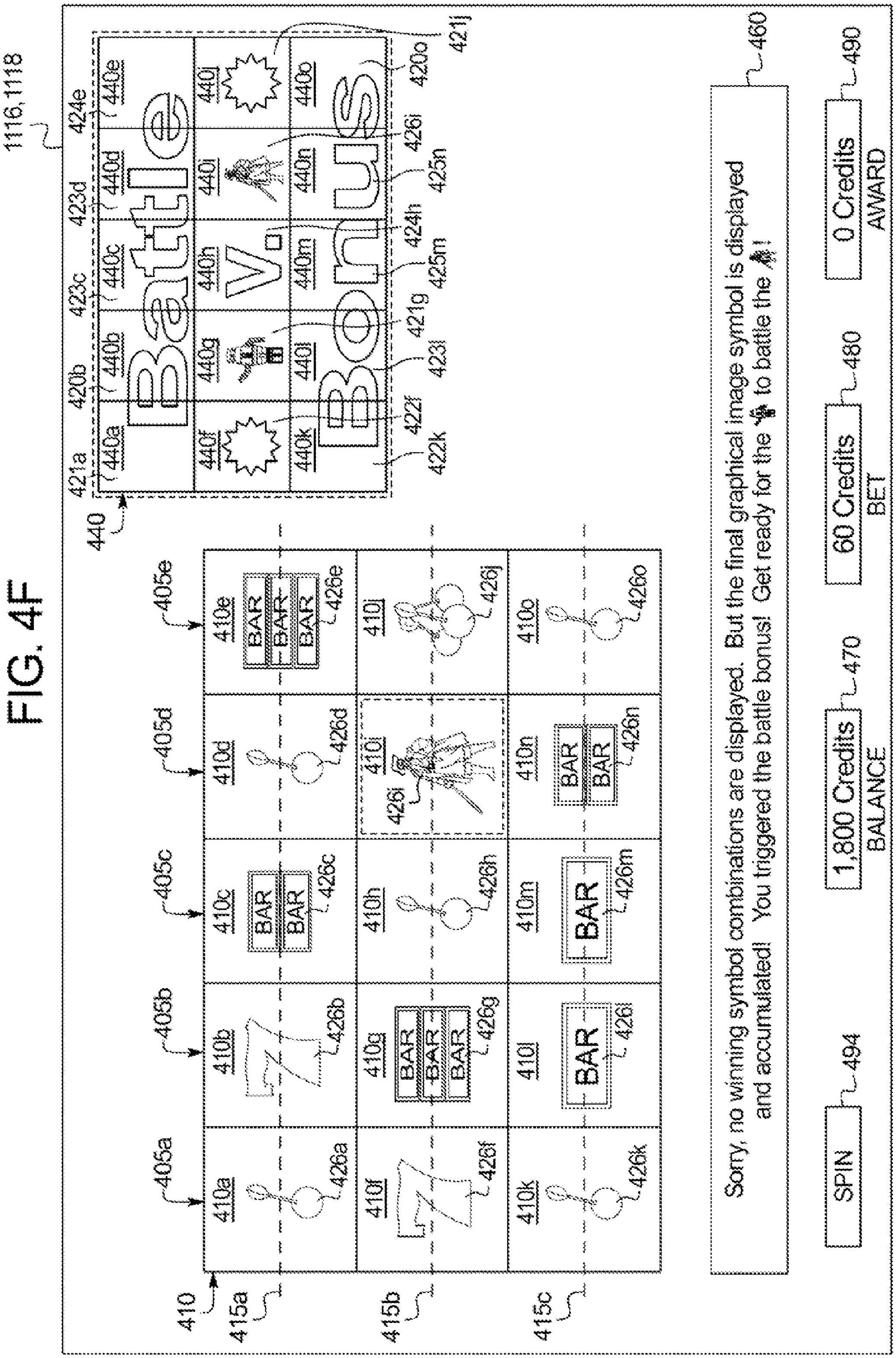

FIG. 4F illustrates a screenshot of the gaming system of this example embodiment after receiving another actuation of the spin button 494 and spinning and stopping the reel's.

At this point, the gaming system has: (a) provided four additional plays of the slot game following the play of the slot game described with respect to FIGS. 4D to 4E (b) accumulated common graphical image symbols 422*f*, 422*k*, 423*c*, 423*d*, 423*l*, 424*e*, 424*h*, 425*m*, and 425*n*; and (c) respectively displayed the accumulated common graphical image symbols 422*f*, 422*k*, 423*c*, 423*d*, 423*l*, 424*e*, 424*h*, 425*m*, and 425*n* at their associated symbol display areas 440*f*, 440*k*, 440*c*, 440*d*, 440*l*, 440*e*, 440*h*, 440*m*, and 440*n* of the second set 440. Upon receiving the actuation of the spin button 494, the gaming system reduces the player's credit balance by the 60 credit wager (as shown in credit meter 470), initiates another play of the slot game at the first level, and spins the reels 405*a*, 405*b*, 405*c*, 405*d*, and 405*e*.

The gaming system stopped the reels 405*a*, 405*b*, 405*c*, 405*d*, and 405*e* such that: (a) Cherry game symbol 426*a* is displayed at the first symbol display area 410*a*, (b) Seven game symbol 426*b* is displayed at the first symbol display area 410*b*, (c) Double Bar game symbol 426*c* is displayed at the first symbol display area 410*c*, (d) Cherry game symbol 426*d* is displayed at the first symbol display area 410*d*, (e) Triple Bar game symbol 426*e* is displayed at the first symbol display area 410*e*, (f) Seven gate symbol 426*f* is displayed at the first symbol display area 410*f*, (g) Triple Bar game symbol 426*g* is displayed at the first symbol display area 410*g*, (h) Cherry game symbol 426*h* is displayed at the first symbol display area 410*h*, (i) pirate graphical image symbol 426*i* is displayed at the first symbol display area 410*i*, (i) Triple Cherry game symbol 426*j* is displayed at the first symbol display area 410*j*, (k) Cherry game symbol 426*k* is displayed at the first symbol display area 410*k*, (l) Bar game symbol 426*l* is displayed at the first symbol display area 410*l*, (m) Bar game symbol 426*m* is displayed at the first symbol display area 410*m*, (n) Double Bar game symbol 426*n* is displayed at the first symbol display area 410*n*, and (o) Cherry game symbol 426*o* is displayed at the first symbol display area 410*o*.

The gaming system determines, any awards associated with the game symbols displayed at the first symbol display area of the first set by determining whether any winning Combinations of the game symbols included in the paytable (not shown) associated with the slot game are displayed along any of the wagered-on paylines 415*a*, 415*b*, and/or 415*c*. In this example embodiment the gaming system determines that no awards are associated with the game symbols displayed at the first symbol display areas of the first set.

The gaming system determines whether any graphical image symbols are displayed at any of the first symbol display areas of the first set 410. Here, the gaming system determines that one graphical image symbol 426*i* is displayed at the first symbol display area 410*i* of the first set 410. Accordingly, the gaming system determines, for that displayed graphical image symbol, whether to accumulate that graphical image symbol has described above). With respect to the pirate graphical image symbol 426*i*, the gaming system determines to accumulate the pirate graphical image symbol 426*i* because: (a) the pirate graphical image symbol 426*i* and the first symbol display area 410*i* of the first set 410 are both associated with the same symbol display area 440*i* of the second set 440, and (b) no graphical image symbol is displayed at the second symbol display area 440*i* of the second set 440. Accordingly, the gaming system: (a) accumulates the pirate graphical image symbol 426*i*, and (b) displays the accumulated pirate graphical image symbol 426*i* at the second symbol display area 440*i* of the second set 440 with which the accumulated pirate graphical image symbol 426*i* is associated.

The gaming system determines whether any of the complete sets of graphical image symbols have been accumulated. Here, the gaming system determines that one of the complete sets of graphical image symbols has been accumulated, and provides the battle bonus game of the type associated with the accumulated complete set. The gaming system displays the following message in the message box 460: "SORRY, NO WINNING SYMBOL COMBINATIONS ARE DISPLAYED, BUT THE FINAL GRAPHICAL IMAGE SYMBOL IS DISPLAYED AND ACCUMULATED! YOU TRIGGERED THE BATTLE BONUS! GET READY FOR THE ROBOT TO BATTLE THE PIRATE!"

Other Embodiments

In various embodiments, a graphical image symbol may be associated with a plurality of the second symbol display areas of the second set. In one such embodiment, if that graphical image symbol is displayed at one of the first symbol display areas of the first set, the gaming system accumulates that graphical image symbol if at least one of the second symbol display areas of the second set with which that graphical image is associated does not display a graphical image symbol. For instance, if each second symbol display area of the second set is configured to display a graphical image symbol representing one of the letters of the phrase "BINGO BONUS" and the graphical image symbol representing the letter "B" is displayed at one of the first symbol display areas of the first set, the gaming system accumulates the graphical image symbol representing the letter "B" if at least one of the second symbol display areas of the second set associated with the graphical image symbol representing the letter "B" does not display a graphical image symbol.

In another such embodiment, if that graphical image symbol is displayed at one of the first symbol display areas of the first set and that displayed graphical image symbol and that first symbol display area of the first set are associated with the same second symbol display area or the second set, the gaming system accumulates that graphical image symbol if that second symbol display area of the second set does not display a graphical image symbol.

In certain embodiments, each of the graphical image symbols is associated with one of the second symbol display areas of the second set, and each column (or any other suitable set) of symbol display areas of the first set is associated with a different corresponding column (or any other suitable set) of symbol display areas of the second set. In these embodiments, the gaming system accumulates a graphical image symbol displayed at one of the first symbol display areas of a first one of the columns of the first set if: (a) the graphical image symbol displayed at that first symbol display area of the first column of the first set is associated with a symbol display area of the second set included in the column of symbol display areas of the second set that is associated with the first column of symbol display areas, and (b) a graphical image symbol is not displayed at the second symbol display area of the second set with which the graphical image symbol displayed at that first symbol display area of the first column of the first set is associated. Thus, in this example embodiment, for the gaming system to accumulate a particular graphical image symbol, that graphical image symbol must be displayed at a symbol display area of a particular column of symbol display areas of the first set.

In other embodiments, each of the graphical image symbols is associated with one of the second symbol display areas of the second set, and each row (or any other suitable set) of symbol display areas of the first set is associated with a different corresponding row (or any other suitable set) of symbol display areas of the second set. In these embodiments, the gaming system accumulates a graphical image symbol displayed at one of the first symbol display areas of a first one of the rows of the first set it (a) the graphical image symbol displayed at that first symbol display area of the first row of the first set is associated with a symbol display area of the second set included in the row of symbol display areas of the second set that is associated with the first row of symbol display areas, and (b) a graphical image symbol is not displayed at the second symbol display area of the second set with which the graphical image symbol displayed at that first symbol display area of the first row of the first set is associated. Thus, in this example embodiment, for the gaming system to accumulate a particular graphical image symbol, that graphical image symbol must be displayed at a symbol display area of a particular row of symbol display areas of the first set.

In various embodiments, the gaming system enables the accumulation of graphical image symbols of two (or more) separate complete sets at once. In these embodiments, the plurality of symbols employed for the play of the slot game includes the graphical image symbols of the two (or more) complete sets. For instance, in one example embodiment, the slot game is associated with a first complete set of graphical image symbols associated with a modifier and a second different complete set of graphical image symbols associated with a bonus trigger. In this example embodiment, the plurality of symbols employed for the slot game includes the symbols of the first complete set and the symbols of the second complete set. Accordingly, the gaming system enables the player to accumulate graphical image symbols from both complete sets simultaneously.

In certain embodiments, the second set of symbol display areas includes fewer symbol display areas than the first set of symbol display areas. In one such embodiment, certain of the first symbol display areas of the first set are associated with at least one of the second symbol display areas of the second set and other first symbol display areas of the first set are not associated with any second symbol display areas of the second set. For instance, in one example embodiment, the first set includes fifteen symbol display area arranged in a 3×5 grid or matrix and the second set includes five symbol display areas arranged in a 1×5 grid or matrix. In this example embodiment, the first symbol display areas of the top and bottom rows of the grid or matrix of the first set are not associated with any symbol display areas of the grid or matrix of the second set, and the first symbol display areas of the middle row of the first set are respectively associated with the second symbol display areas of the second set.

In various embodiments, if the gaming system determines to accumulate a graphical image symbol displayed at one of the first symbol display areas of the first set, the gaming system enables the player to veto that decision such that the gaming system does not accumulate that graphical image symbol. For instance, in an embodiment in which a plurality of graphical image symbols are associated with the same second symbol display area of the second set and only one of the graphical image symbols may be accumulated and displayed at that symbol display area, the gaming system enables the player to veto the gaming system's determination to accumulate one of those graphical image symbols, which enables the player to subsequently attempt to accumulate a different one of those graphical image symbols (such as a more beneficial one of those graphical image symbols).

In certain embodiments, the gaming system stores or otherwise saves any accumulated graphical image symbols upon receiving a gaming session termination input from the player. For instance, in an example embodiment in which the player has identified herself by inserting her player tracking card into the gaming system before playing a particular game at a particular denomination, the gaming system stores data representing any accumulated graphical image symbols in association with the payers player tracking account. Thus, the next time the player identifies herself using her player tracking card while playing that game at that denomination the gaming system restores the accumulated graphical image symbols.

In other embodiments, upon receiving a gaming session termination input from the player, the gaming system terminates the player's gaming session without saving any accumulated graphical image symbols in association with the player. Thus, in these embodiments, a subsequent player may use the accumulated graphical image symbols that were accumulated by one or more prior players.

In certain embodiments, if a graphical image symbol is displayed at one of the first symbol display areas of the first set and a graphical image symbol is already displayed at the second symbol display area of the second set with which that graphical image symbol is associated, the gaming system provides a modifier such as a multiplier) for use in the primary game or the feature associated the accumulation of the complete set of graphical image symbols.

In various embodiments, the plurality of symbols employed for the slot game includes at least one Wild symbol. In one embodiment, when a Wild symbol is displayed at one of the first symbol display areas of the first set and a graphical image symbol is not displayed at at least one of the second symbol display areas of the second set, the gaming system: (a) accumulates the graphical image symbol associated with one of the second symbol display areas of the second set at which a graphical image symbol is not displayed, and (b) displays the accumulated graphical image symbol at that second symbol display area of the second set. It should be appreciated that if a plurality of the second symbol display areas of the second set do not display graphical image symbols, the gaming system determines which of the graphical image symbols to accumulate in any suitable manner, such as randomly Or based on the probabilities of those graphical image symbols being accumulated.

In other embodiments, when a Wild symbol is displayed at one of the first symbol display areas of the first set and a graphical image symbol is not displayed at at least one of the second symbol display areas of the second set, the gaming system: (a) accumulates the Wild symbol, and (b) displays the accumulated Wild symbol at one of the second symbol display areas of the second set at which a graphical image symbol is not displayed.

In further embodiments, when a Wild symbol is displayed at one of the first symbol display areas of the first set and a graphical image symbol is not displayed the second symbol display area of the second set associated with that first symbol display area of the first set, the gaming system: (a) accumulates the graphical image symbol (or one of the graphical image symbols) associated with that symbol display area of the second set and (b) displays the accumulated graphical image symbol at that symbol display area of the second set.

In certain embodiments in which a plurality of graphical image symbols are each associated with a particular second symbol display area of the second set, if: (a) a first one of those graphical image symbols is displayed at one of the first symbol display areas of the first set, and (b) a second different one of those graphical image symbols is already displayed at the particular second symbol display area of the second set, the gamin system replaces the second graphical image symbol displayed at the particular second symbol display area of the second set with the first graphical image symbol. In one embodiment, the gaming system does so if the replacement would benefit the player.

In further embodiments in which a plurality of graphical image symbols are each associated with a first symbol display area of the second set, if: (a) a first one of those graphical image symbols is displayed at one of the first symbol display areas of the first set, and (b) a second different one of those graphical image symbols is already displayed at the first symbol display area of the second set, the gaming system displays both the second graphical image symbol and the first graphical image symbol at the first symbol display area of the second set.

In various embodiments, at least one of the game symbols employed for the slot game is associated with one or more graphical image sub-symbols. For instance, in one example embodiment, a plurality of the game symbols employed for the play of the slot game include graphical image sub-symbols as backgrounds (e.g. a Seven game symbol including a graphical image sub-symbol background). In certain such embodiments, the plurality of symbols employed for the slot game include both graphical image symbols and game symbols associated with graphical image sub symbols. In other such embodiments, the plurality of symbols employed for the slot game include game symbols associated with graphical image sub-symbols but no graphical image symbols.

In certain embodiments, the gaming system determines any awards based on any graphical image symbols displayed at the symbol display areas of the first set. For instance, in one example embodiment, the graphical image symbols may form winning symbol combinations when displayed along wagered-on paylines at the symbol display areas of the first set. In another example embodiment, the gaming system determines a scatter award when a designated quantity of graphical image symbols are displayed at the symbol display areas of the first set. In another example embodiment, the gaming system determines an award when a graphical image symbol is displayed at a designated symbol display area of the first set. In another example embodiment, the morning system determines an award when a graphical image symbol is displayed at one of the symbol display areas of the first set and is not accumulated. In another example embodiment, the graphical image symbols are Wild symbols. In another example embodiment, the graphical image symbols are Bonus symbols. In this example embodiment, when a designated quantity of the graphical image symbols (i.e., Bonus symbols in this example embodiment) are displayed, the gaming system provides a bonus (Such as a play of a bonus game).

It should be appreciated that the graphical image may be any suitable graphical image, such as (but not limited to): a picture, a photograph, a video, an animation, and/or a drawing.

In various embodiments, the gaming system displays a graphical image symbol at the second symbol display area of the second set with which that graphical image symbol is associated by one or more of (a) "filling in" a phantom or dashed representation of that graphical image symbol displayed at that symbol display area of the second set with solid lines; (b) displaying the graphical image itself at that symbol display area of the second set; (c) brightening a dull representation of that graphical image symbol displayed at that symbol display area of the second set; (d) displaying an animation at that symbol display area of the second set; (e) "coloring in" a grayscale representation of that graphical image symbol displayed at that symbol display area of the second set; and (f) displaying a video clip or other suitable animation at that symbol display area of the second set.

Figure 6A:
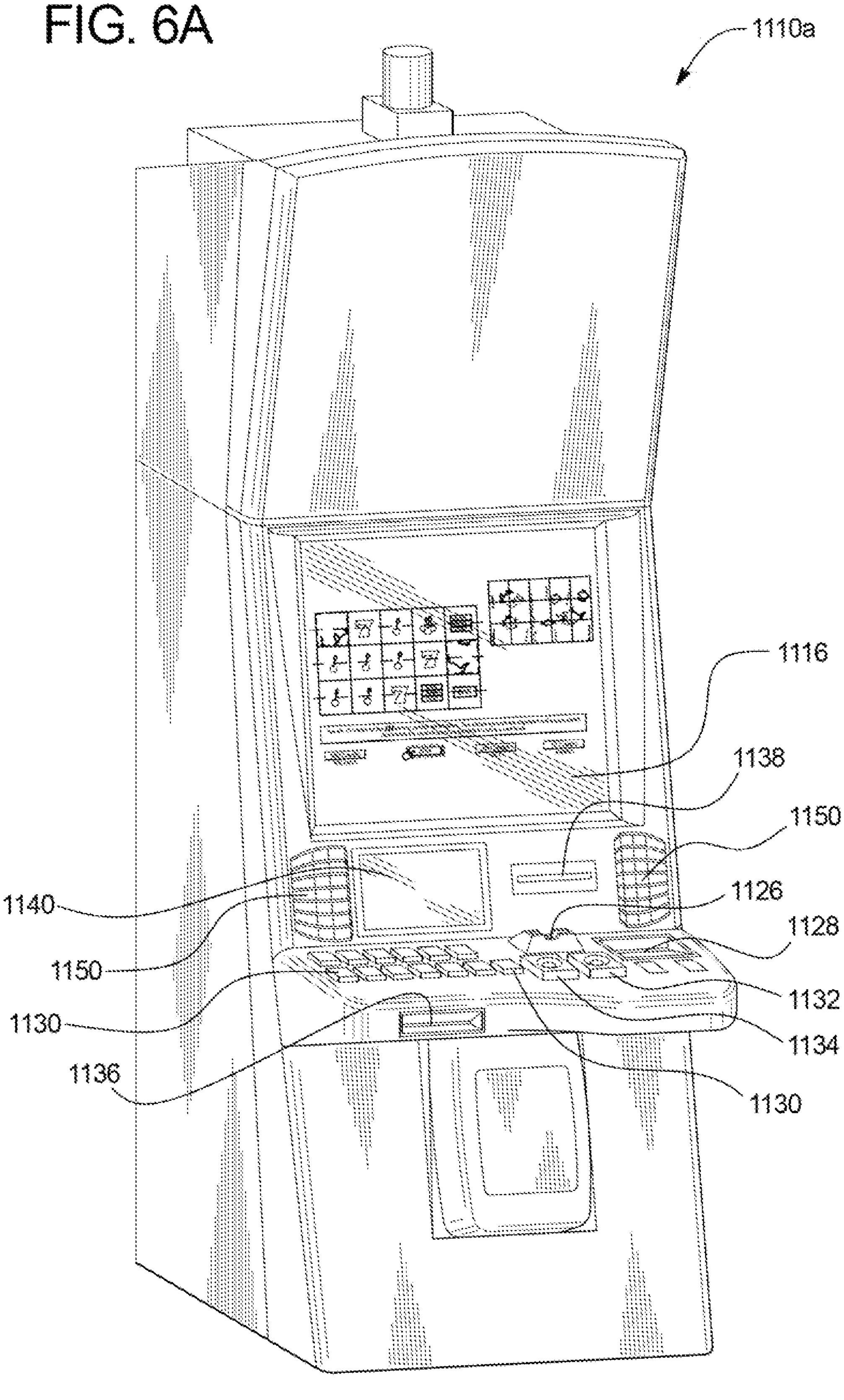
FIGS. 6A and 6B are perspective views of exempts alternative embodiments of the gaming system of the present disclosure.
Figure 6B:
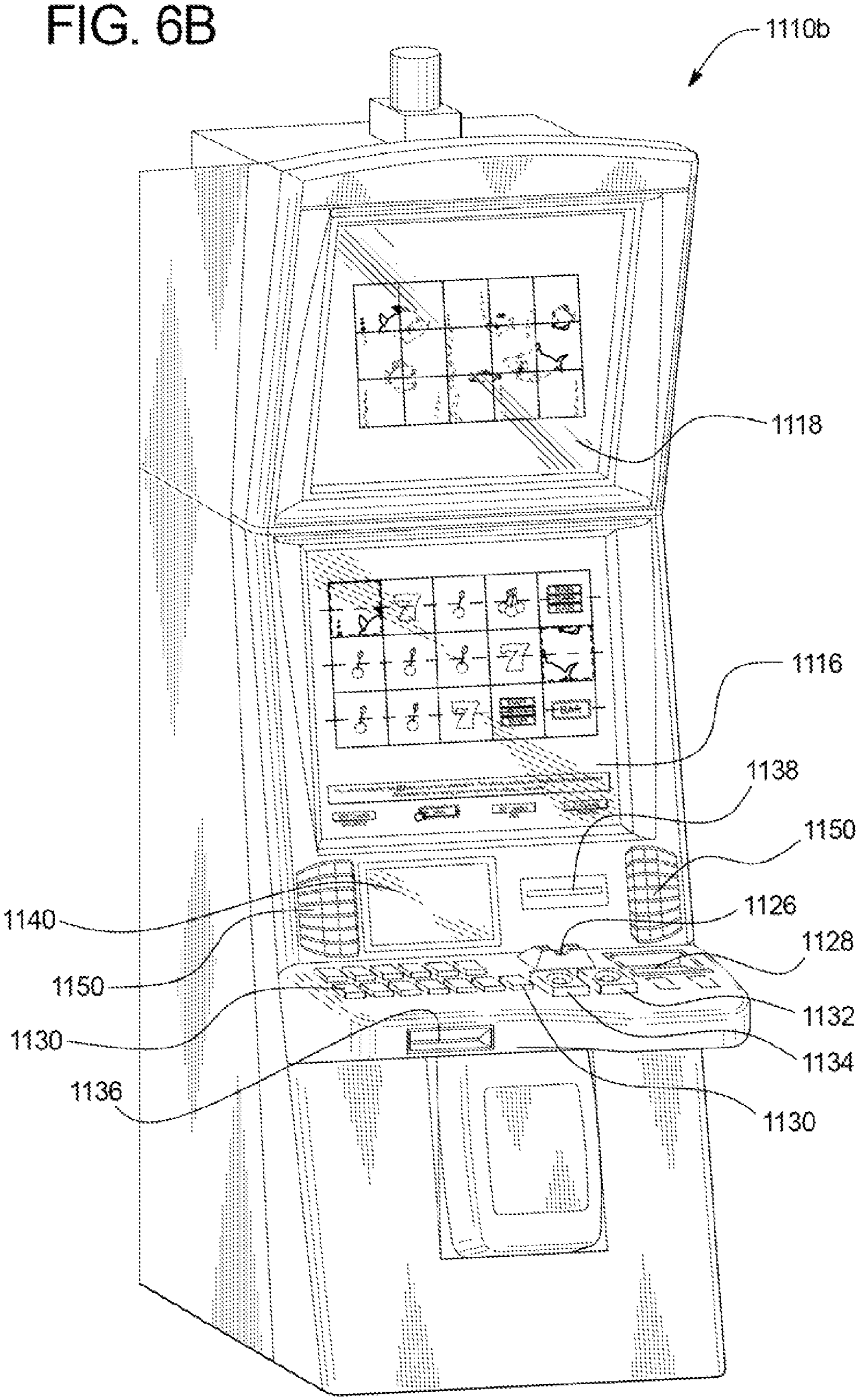

In one embodiment, such as the embodiment shown in FIG. 6B, the gaming system displays the second set of symbol display areas on a secondary display, such as a top box. In another embodiment, the gaming system displays the second set of symbol display areas in a service window (not shown) or a player tracking window (not shown).

In certain embodiments, the graphical image is a "tall" or "oversized" graphical image represented by a plurality of subsets of graphical image symbols. In these embodiments, at a given point in time, the gaming system employs and enables the player to accumulate the graphical image symbols of a group of the subsets that represent a portion of, but not all of, the graphical image. When the player accumulates all of the graphical image symbols of a designated one of the subsets, the gaming system: (a) determines a new group of the subsets that represents a different portion of but not all of, the graphical image and that includes at least one new subset and any subsets of the previous group for which all of the graphical image symbols were not accumulated, and (b) employs and enables the player to accumulate the graphical image symbols of the subsets of the new group.

For instance, in one example embodiment, the graphical image is a skyscraper (or any other suitable image such as a redwood tree, a Christmas tree, a pagoda, the Eiffel tower, and the like) represented by fifteen rows (i.e., subsets in this example embodiment) of graphical image symbols numbered from one at the top of the skyscraper to fifteen at the bottom of the skyscraper. In this example embodiment, the gaming system initially employs and enables the player to accumulate the graphical image symbols of a group of the rows including rows thirteen to fifteen, which represent a portion of, but not all of, the skyscraper including the bottom of the skyscraper, in this example embodiment, once the player accumulates the graphical image symbols of a designated one of the rows, which is the bottom row (row fifteen) in this example embodiment, the gaming system: (a) determines a new group of the rows including rows twelve to fourteen, which represent a different portion of, but not all of, the skyscraper above the bottom of the skyscraper, and includes new row twelve and rows thirteen and fourteen from the prior group of rows since all of the graphical image symbols of those rows have not yet been accumulated); and (b) employs and enables the player to accumulate the graphical image symbols of rows twelve to fourteen. Put differently, once the player accumulates the graphical image symbols of the bottom row of the group of rows, the gaming system "climbs" the skyscraper such that the graphical image symbols of the next highest row are available to be accumulated.

In this example embodiment, the gaming system enables the player to "climb" multiple rows at once. For instance, if the player has accumulated each of the graphical image symbols of row thirteen, each of the graphical image symbols of now fourteen, and all but one of the graphical image symbols of row fifteen (i.e., the bottom row in this example embodiment), the gaming system: (a) determines a new group of the rows including rows ten to twelve, which represent a different portion of, but not all of, the skyscraper (because all of the graphical image symbols of rows thirteen to fifteen have been accumulated); and (b) employs and enables the player to accumulate the graphical image symbols of rows ten to twelve.

In certain such embodiments, when the gaming system accumulates each of the graphical image symbols of a particular subset of the graphical image symbols, the gaming system provides an award to the player (such as any of the awards described above), in one embodiment, the awards become more valuable as the player accumulates each of the graphical image symbols of more and more subsets. For instance, continuing with the above-described example embodiment, the gaming system provides a first award when the player accumulates each of the graphical image symbols of row fifteen, a second greater award when the player accumulates each of the graphical image symbols of row fourteen, an even greater third award when then player accumulates each of the graphical image symbols of row thirteen, and so on. In one embodiment, the gaming system provides a relatively large award, such as a jackpot award or a progressive award, when the player accumulates all of the graphical image symbols of all of the subsets associated with the graphical image.

In certain embodiments in which the gaming system enables "climbing" of multiple rows at once, the gaming system provides an additional award or an award enhancer when multiple rows are climbed at once.

In certain instances, the gaming system employs such an embodiment as a bonus game, and resets the player to the initial group of the subsets (e.g., the bottom of the skyscraper in the above-described example embodiment) on completion of the bonus game. In other instances, the gaming system employs-such an embodiment as a feature that causes the gaming system to progressively increase the average expected payback percentage of the game over time.

It should be appreciated that the subsets may represent any suitable portion of the graphical image, such as a row of the graphical image or a column of the graphical image. In various embodiments, the gaming system enables the player to move from top to bottom rather than from bottom to top (e.g., enables the player to descend a mountain rather than, climb a mountain) or to move from left to right or tight to left rather than from top to bottom or bottom to top.

In various embodiments, the gaming system accumulates a designated quantity of (such as all of or all of the yet to be accumulated) the graphical image symbols of a particular subset when one or more designated symbols or a designated combination of a plurality of designated symbols is generated and displayed.

In other embodiments, the gaming system "dis-accumulates" one or more previously-accumulated graphical image symbols upon an occurrence of a particular triggering event. For instance, in an example embodiment in which the graphical image includes a skyscraper with King Kong at the top, if a King Kong symbols is generated and displayed the gaming system "dis-accumulates" all of the graphical image symbols of the topmost row of the group. In another example embodiment, if the gaming system generates and displays the King Kong symbol, the gaming system dis-accumulates one of, but not all of, the accumulated graphical image symbols of one of the rows of the group.

In certain embodiments, the number of graphical image symbols included in the subsets varies. For instance, the subsets may include fewer graphical image symbols as the player progresses up (or down, or left, or right) the graphical image. For example, the bottom row includes five graphical image symbols while the to row includes one graphical image symbol.

It should be appreciated that:

(a) the feature provided when a complete set of graphical image symbols is accumulated;

(b) the quantity of symbol display areas in the first set;

(c) the quantity of symbol display areas in the second set;

(d) the associations (if any) between the first and second symbol display areas of the first and second sets;

(e) the quantity of graphical image symbols in a particular complete set;

(f) the associations between the graphical image symbols and the second symbol display areas of the second set;

(g) how the gaming system determines whether to accumulate a graphical image symbol displayed at one of the first symbol display areas of the first set;

(h) the manner in which the gaming system displays an accumulated graphical image symbol at an associated symbol display area of the second set;

(i) the quantity of paylines;

(j) the first symbol display areas with which each payline is associated;

(k) the quantity of reels;

(l) the quantity of symbol display areas with which each reel is associated;

(m) the particular symbol display areas with which each reel is associated;

(n) the quantity of second symbol display areas of the second set with which each graphical image symbol is associated;

(o) the quantity of graphical image symbols with which each symbol display area of the second set is associated: and/or (p) any other variables or determinations described herein may be: (1) predetermined (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM configured to operate the sot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day; (20) determined based on an amount of coin-in accumulated in one or more pods; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality Of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs and "central server, central controller, or remote host" as used herein represents one central server, central controller, or remote host or a plurality of central servers, central controllers, or remote hosts.

Figure 5A:
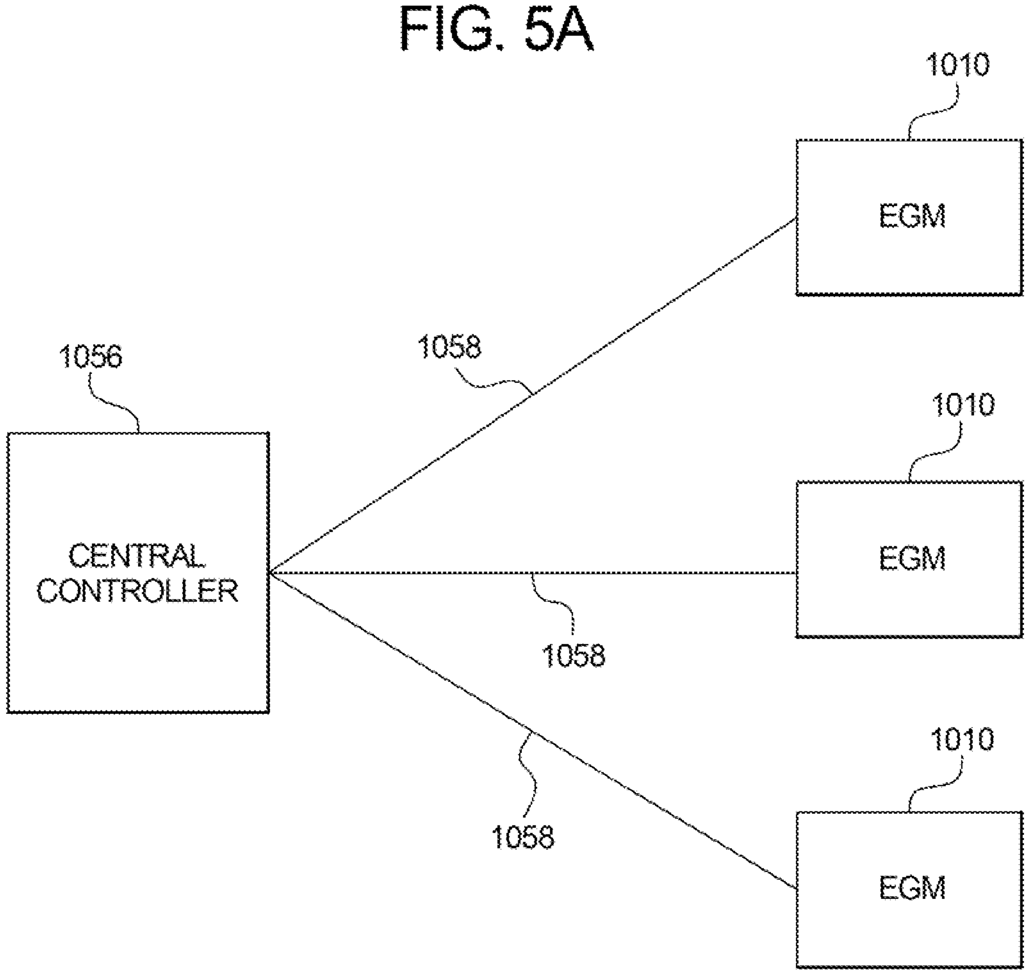
FIG. 5A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central sewer, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games for suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located; (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network and/or (b) a plurality of EGMs configured to communicate with one another through a data network, the data network is an internet or an intranet, in certain such embodiments, an internist browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host or by identifying the EGM, such as by identifying the MAC address or the IP address of the internet facilitator. In various embodiments, once the central server, central controller, or remote host identifies the player, the central server, central controller, or remote host enables placement of one or more wagers on one or more pays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner, in various embodiments, such a connection is accomplished via: a conventional phone fine or other data transmission line, a digital subscriber line (DSL), a T-1 line, a coaxial cable, a fiber optic cable, a wireless or wired routing device, a mobile communications network connection (such as a cellular network or mobile inter network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
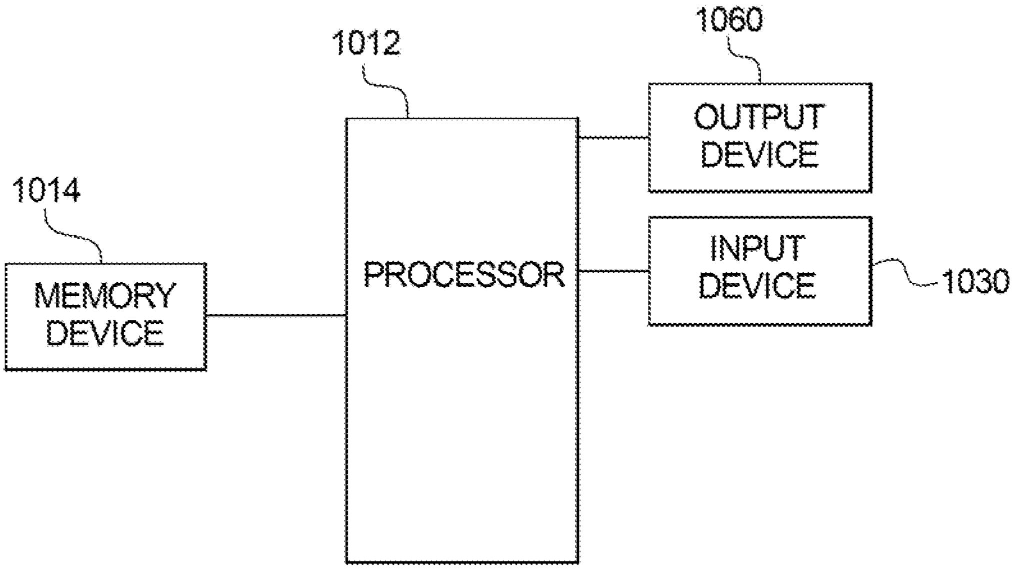
FIG. 5B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or at of the program code and/or the operating data described above is stored in at least one detachable or removable memory device including, but not limited to, a cartridge, a disk, a CD ROM, a DVD, a USE memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) ticket acceptor into which a ticket or a voucher is inserted to fund the EGM; (c) a coin slot into which coins or tokens are inserted to fund the EGM; (d) a reader or a vaiidator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a Play of a game on the EGM or a sequence of events associated with the EGM following appropriate funding of the EGM. The example EGMs illustrated in FIGS. 6A and 6B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a players player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 8B includes a central display device 1116, an upper display device 1116, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light emitting diodes (PLEDs), a display based on a plurality of surface-conduction election-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator Configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackbans, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMS may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs". Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a corn acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at feast one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system wilt ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. On a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card, if the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reefs when specified types and/or configurations of the indicia or symbols on the reels occur on an active payline or otherwise occur in a winning pattern, occur on the requisite number of adjacent reels, and/or occur in a scatter pay arrangement.

In certain embodiments the gaming system employs a ways to win award determination. In these embodiments, any outcome to be provided is determined based on a number of associated symbols that are generated in active symbol di lay areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of was to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(S) and is accompanied with more attractive or unusual features than the primary game(s) it should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play such as number of games, number of credits, amount of time being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play an the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in". For example, qualification through other specified activities is unsuccessful, payment of a fee or placement of an additional wager "buys-in" to the secondary game. In certain embodiments, a separate side wager must be placed on the secondary game Or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMS enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176660, and 2009/0124363 describe various examples of different group gaming systems.

In various embodiments, the gaming system includes one of more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a and reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/Dr the time at which these wagers are placed. In different embodiments, for one or more players, the player tracking system includes the player's account number, the player's card number, the player's first name, the player's surname, the players preferred name, the player's player tracking ranking, any promotion status associated with the players player tracking card, the player's address, the players birthday, the player's anniversary, the players recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S.

Pat. Nos. 6,722,985; 6,908,387; 7,311,605; 7,611,411; 7,617,151; and No. 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing and including an acceptor;

at least one display device supported by the housing;

at least one processor; and at least one memory device that stores a plurality of instructions which, when executed by the at least one processor, cause the at least one processor to operate with the plurality of input devices and the at least one display device to:

(a) establish a credit balance based at least in part on a monetary value associated with a physical item following receipt of the physical item by the acceptor, the physical item being one of a ticket and currency;

(b) display a first set of a plurality of first symbol display areas;

(c) separately display a second different set of a plurality of second symbol display areas;

(d) for each play of a game:

(i) randomly determine and display a plurality of symbols of a set of a plurality of different symbols at the first symbol display areas of the first set, wherein:

(A) the set of the plurality of different symbols includes a plurality of different graphical image symbols and a plurality of different game symbols, (B) each of the graphical image symbols is associated with a portion of at least one of a plurality of different graphical images, and (C) each of the graphical image symbols is associated with one of the second symbol display areas of the second set;

(iii) determine and display any awards associated with any game symbols displayed at the first symbol display areas of the first set, the credit balance increasable by any determined awards; and (iv) for each of any graphical image symbols displayed at the first symbol display areas of the first set, if a graphical image symbol is not displayed at the second symbol display area of the second set with which said displayed graphical image symbol is associated, accumulate said displayed graphical image symbol and display said accumulated graphical image symbol at the second symbol display area of the second set with which said accumulated graphical image symbol is associated;

(e) when a first complete set of a plurality of the graphical image symbols is accumulated such that a first one of the graphical images is displayed, provide a first one of a plurality of different features;

(f) when a second different complete set of a plurality of the graphical image symbols is accumulated such that a second different one of the graphical images is displayed, provide a second different one of the features, wherein:

(i) the first complete set of the graphical image symbols includes at least one graphical image symbol not included in the second complete set of the graphical image symbols, (ii) the second complete set of the graphical image symbols includes at least one graphical image symbol not included in the first complete set of the graphical image symbols, and (iii) the first complete set of the graphical image symbols and the second complete set of the graphical image symbols each include at least one same one of the graphical image symbols; and (g) initiate a payout associated with the credit balance following receipt of an actuation of a cashout button.

2. The gaming system of claim 1, wherein at least two of the graphical image symbols are associated with a same one of the second symbol display areas of the second set.

3. The gaming system of claim 1, wherein the first feature and the second feature are one of: (a) different bonus games, and (b) different game themes.

4. The gaming system of claim 1, wherein the set of the plurality of different symbols includes at least one wild symbol configured to represent any of the graphical image symbols.

5. The gaming system of claim 1, wherein each of the first symbol display areas of the first set is associated with a different one of the second symbol display areas of the second set.

6. The gaming system of claim 5, wherein the plurality of instructions, when executed by the at least one processor, cause the at least one processor to operate with the at least one display device to, for each of any graphical image symbols displayed at the first symbol display areas of the first set, if: (a) said displayed graphical image symbol and the first symbol display area of the first set at which said graphical image symbol is displayed are associated with the same second symbol display area of the second set, and (b) a graphical image symbol is not displayed at the second symbol display area of the second set with which said displayed graphical image symbol and the first symbol display area of the first set at which said graphical image symbol is displayed are associated, accumulate said displayed graphical image symbol and display said accumulated graphical image symbol at the second symbol display area of the second set with which said accumulated graphical image symbol is associated.

7. The gaming system of claim 1, which includes: (1) a player tracking device including a player tracking card reader configured to receive and read a player tracking card to facilitate storing tracked game play data with a player associated with that player tracking card, and (2) a ticket printer configured to print a ticket associated with a value representative of the credit balance following receipt of the actuation of the cashout button.

8. A method of operating a gaming system, said method comprising:

(a) receiving, by an acceptor, a physical item associated with a monetary value, the physical item being one of a ticket and currency;

(b) establishing, by at least one processor, a credit balance based at least in part on the monetary value associated with the received physical item;

(c) displaying, by at least one display device, a first set of a plurality of first symbol display areas;

(d) separately displaying, by the at least one display device, a second different set of a plurality of second symbol display areas;

(e) for each play of a game:

(i) randomly determining, by the at least one processor, and displaying, by the at least one display device, a plurality of symbols of a set of a plurality of different symbols at said first symbol display areas of the first set, wherein:

(A) the set of the plurality of different symbols includes a plurality of different graphical image symbols and a plurality of different game symbols, (B) each of the graphical image symbols is associated with a portion of at least one of a plurality of different graphical images, and (C) each of the graphical image symbols is associated with one of the second symbol display areas of the second set;

(iii) determining, by the at least one processor, and displaying, by the at least one display device, any awards associated with any game symbols displayed at the first symbol display areas of the first set, the credit balance increasable by any determined awards; and (iv) for each of any graphical image symbols displayed at the first symbol display areas of the first set, if a graphical image symbol is not displayed at the second symbol display area of the second set with which said displayed graphical image symbol is associated, accumulating, by the at least one processor, said displayed graphical image symbol and displaying, by the at least one display device, said accumulated graphical image symbol at the second symbol display area of the second set with which said accumulated graphical image symbol is associated;

(f) when a first complete set of a plurality of the graphical image symbols is accumulated such that a first one of the graphical images is displayed, providing a first one of a plurality of different features;

(g) when a second different complete set of a plurality of the graphical image symbols is accumulated such that a second different one of the graphical images is displayed, providing a second different one of the features, wherein:

(i) the first complete set of the graphical image symbols includes at least one graphical image symbol not included in the second complete set of the graphical image symbols, (ii) the second complete set of the graphical image symbols includes at least one graphical image symbol not included in the first complete set of the graphical image symbols, and (iii) the first complete set of the graphical image symbols and the second complete set of the graphical image symbols each include at least one same one of the graphical image symbols;

(h) receiving an actuation of a cashout button; and (i) initiating, by the at least one processor, a payout associated with the credit balance responsive to the received actuation of the cashout button.

9. The method of claim 8, wherein at least two of the graphical image symbols are associated with a same one of the second symbol display areas of the second set.

10. The method of claim 8, wherein the first feature and the second feature are one of: (a) different bonus games, and (b) different game themes.

11. The method of claim 8, wherein the set of the plurality of different symbols includes at least one wild symbol configured to represent any of the graphical image symbols.

12. The method of claim 8, wherein each of the first symbol display areas of the first set is associated with a different one of the second symbol display areas of the second set.

13. The method of claim 12, which includes, for each of any graphical image symbols displayed at the first symbol display areas of the first set, if: (a) said displayed graphical image symbol and the first symbol display area of the first set at which said graphical image symbol is displayed are associated with the same second symbol display area of the second set, and (b) a graphical image symbol is not displayed at the second symbol display area of the second set with which said displayed graphical image symbol and the first symbol display area of the first set at which said graphical image symbol is displayed are associated, accumulating, by the at least one processor, said displayed graphical image symbol and displaying, by the at least one display device, said accumulated graphical image symbol at the second symbol display area of the second set with which said accumulated graphical image symbol is associated.

14. The method of claim 8, which is provided through a data network.

15. The method of claim 14, wherein the data network is an internet.

16. The method of claim 8, which includes: (1) receiving, by a player tracking card reader of a player tracking device, a player tracking card; (2) reading, by the player tracking card reader, the received player tracking card to facilitate storing tracked game play data with a player associated with that player tracking card; and (3) printing, by a ticket printer, a ticket associated with a value representative of the credit balance responsive to the received actuation of the cashout button.

17. A non-transitory computer readable medium storing a plurality of instructions which, when executed by at least one processor, cause the at least one processor to:

(a) establish a credit balance based at least in part on a monetary value associated with a physical item following receipt of the physical item by the acceptor, the physical item being one of a ticket and currency;

(b) cause at least one display device to display a first set of a plurality of first symbol display areas;

(c) cause the at least one display device to separately display a second different set of a plurality of second symbol display areas;

(d) for each play of a game:

(i) randomly determine and cause the at least one display device to display a plurality of symbols of a set of a plurality of different symbols at the first symbol display areas of the first set, wherein:

(A) the set of the plurality of different symbols includes a plurality of different graphical image symbols and a plurality of different game symbols, (B) each of the graphical image symbols is associated with a portion of at least one of a plurality of different graphical images, and (C) each of the graphical image symbols is associated with one of the second symbol display areas of the second set;

(iii) determine and cause the at least one display device to display any awards associated with any game symbols displayed at the first symbol display areas of the first set, the credit balance increasable by any determined awards; and (iv) for each of any graphical image symbols displayed at the first symbol display areas of the first set, if a graphical image symbol is not displayed at the second symbol display area of the second set with which said displayed graphical image symbol is associated, accumulate said displayed graphical image symbol and cause the at least one display device to display said accumulated graphical image symbol at the second symbol display area of the second set with which said accumulated graphical image symbol is associated;

(e) when a first complete set of a plurality of the graphical image symbols is accumulated such that a first one of the graphical images is displayed, provide a first one of a plurality of different features;

(f) when a second different complete set of a plurality of the graphical image symbols is accumulated such that a second different one of the graphical images is displayed, provide a second different one of the features, wherein:

(i) the first complete set of the graphical image symbols includes at least one graphical image symbol not included in the second complete set of the graphical image symbols, (ii) the second complete set of the graphical image symbols includes at least one graphical image symbol not included in the first complete set of the graphical image symbols, and (iii) the first complete set of the graphical image symbols and the second complete set of the graphical image symbols each include at least one same one of the graphical image symbols; and (g) initiate a payout associated with the credit balance following receipt of an actuation of a cashout button.

18. The non-transitory computer readable medium of claim 17, wherein at least two of the graphical image symbols are associated with a same one of the second symbol display areas of the second set.

19. The non-transitory computer readable medium of claim 17, wherein the first feature and the second feature are one of: (a) different bonus games, and (b) different game themes.

20. The non-transitory computer readable medium of claim 17, wherein the set of the plurality of different symbols includes at least one wild symbol configured to represent any of the graphical image symbols.

21. The non-transitory computer readable medium of claim 17, wherein each of the first symbol display areas of the first set is associated with a different one of the second symbol display areas of the second set.

22. The non-transitory computer readable medium of claim 21, wherein the plurality of instructions, when executed by the at least one processor, cause the at least one processor to, for each of any graphical image symbols displayed at the first symbol display areas of the first set, if: (a) said displayed graphical image symbol and the first symbol display area of the first set at which said graphical image symbol is displayed are associated with the same second symbol display area of the second set, and (b) a graphical image symbol is not displayed at the second symbol display area of the second set with which said displayed graphical image symbol and the first symbol display area of the first set at which said graphical image symbol is displayed are associated, accumulate said displayed graphical image symbol and cause the at least one display device to display said accumulated graphical image symbol at the second symbol display area of the second set with which said accumulated graphical image symbol is associated.

23. The non-transitory computer readable medium of claim 17, wherein the plurality of instructions, when executed by the at least one processor, cause the at least one processor to: (1) cause a player tracking card reader of a player tracking device to read a player tracking card received by the player tracking card reader to facilitate storing tracked game play data with a player associated with that player tracking card, and (2) cause a ticket printer to print a ticket associated with a value representative of the credit balance following receipt of the actuation of the cashout button.

* * * * *